Figure 1:
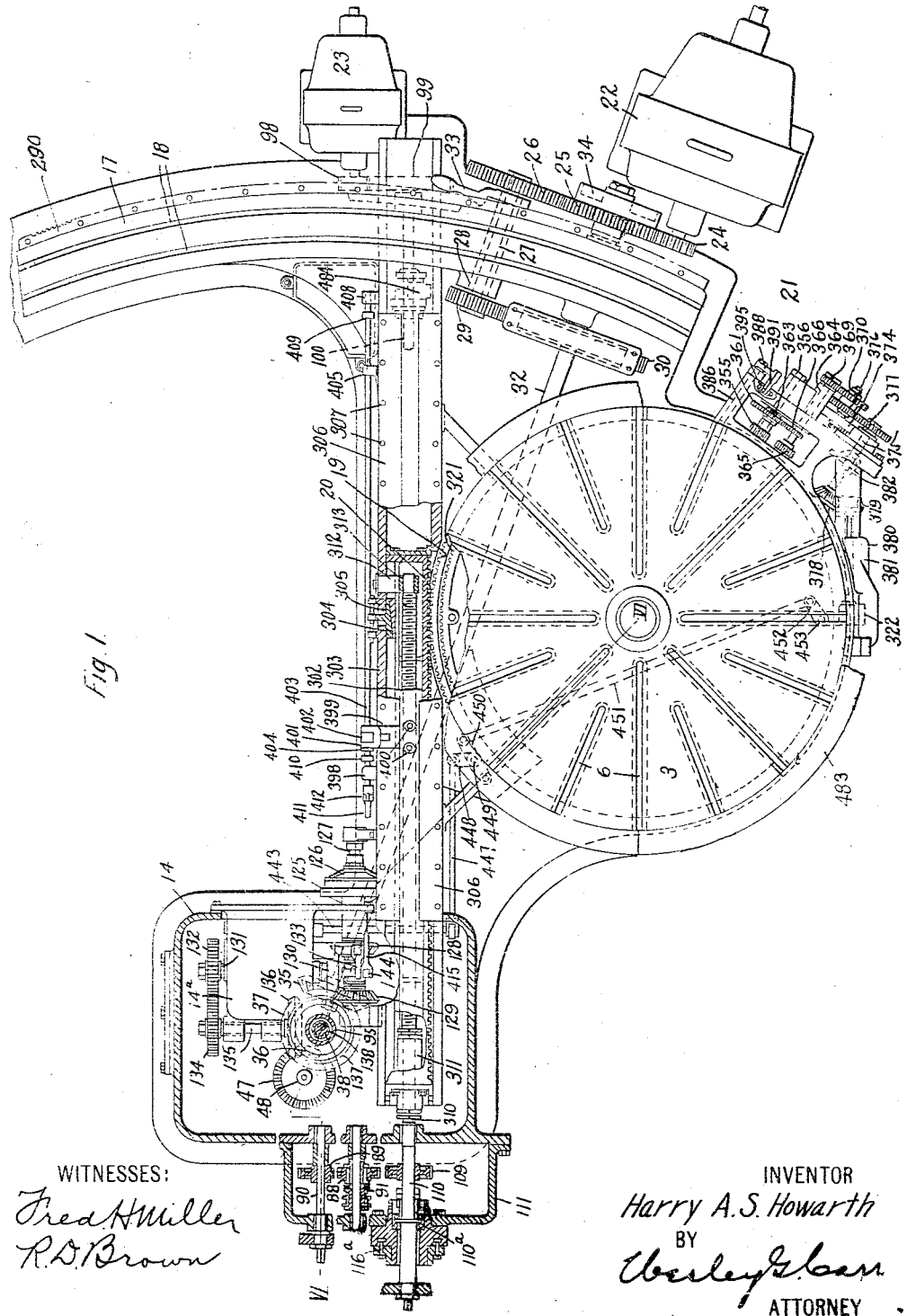

H. A. S. HOWARTH.
GEAR CUTTING MACHINE.
APPLICATION FILED FEB. 17, 1915.

1,286,327.

Patented Dec. 3, 1918.
23 SHEETS—SHEET 1.

WITNESSES:
Fred H Miller
R. D. Brown

INVENTOR
Harry A. S. Howarth
BY
ATTORNEY

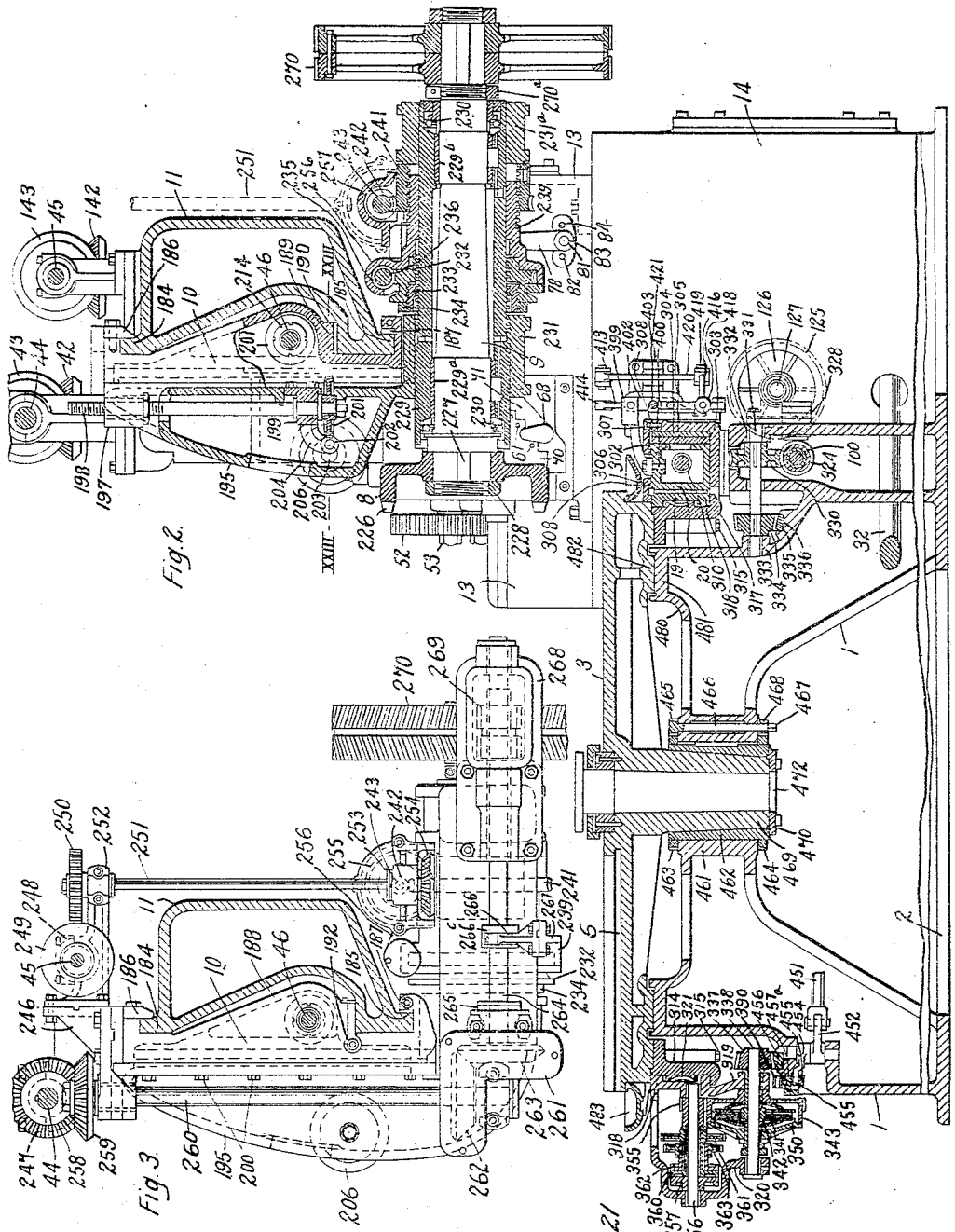

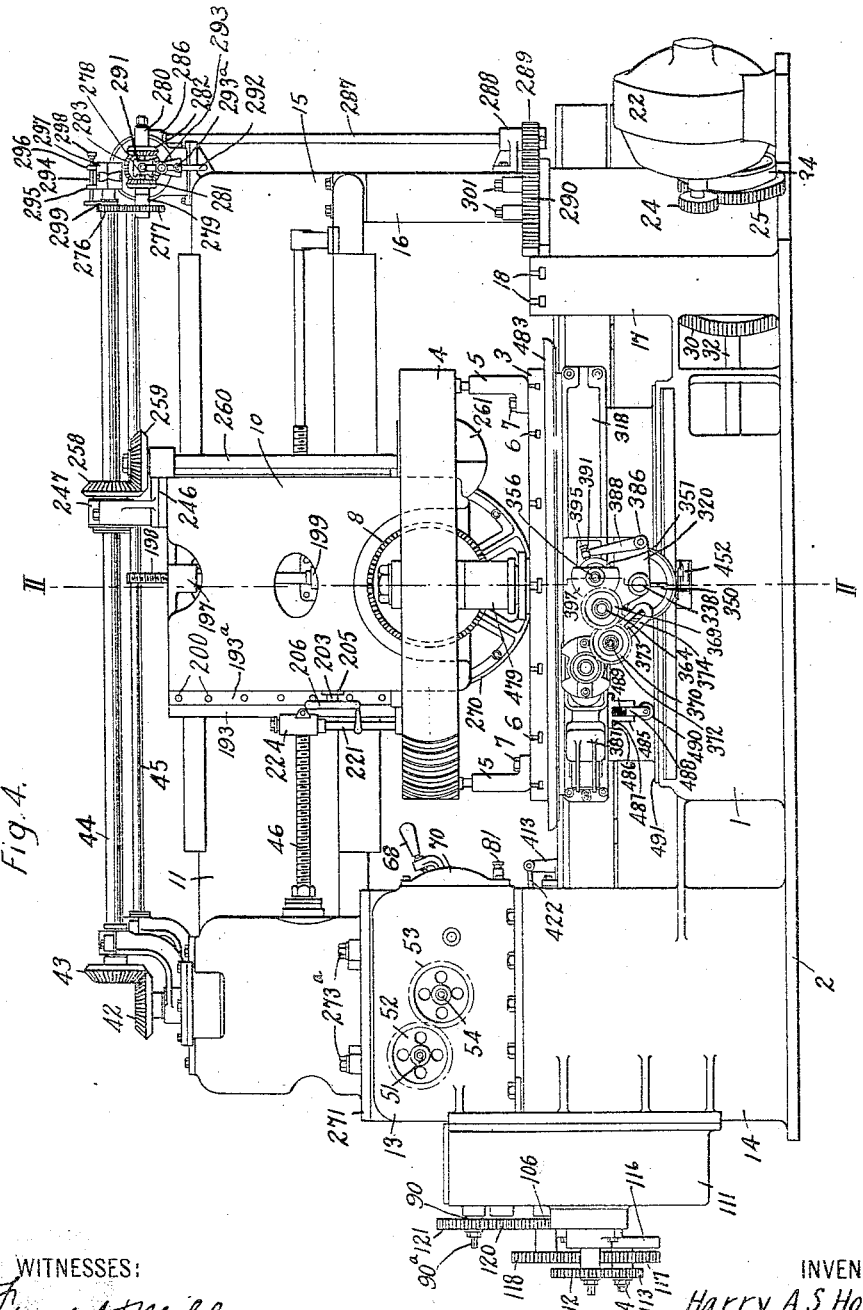

H. A. S. HOWARTH.
GEAR CUTTING MACHINE.
APPLICATION FILED FEB. 17, 1915.
1,286,327.
Patented Dec. 3, 1918
23 SHEETS—SHEET 4.
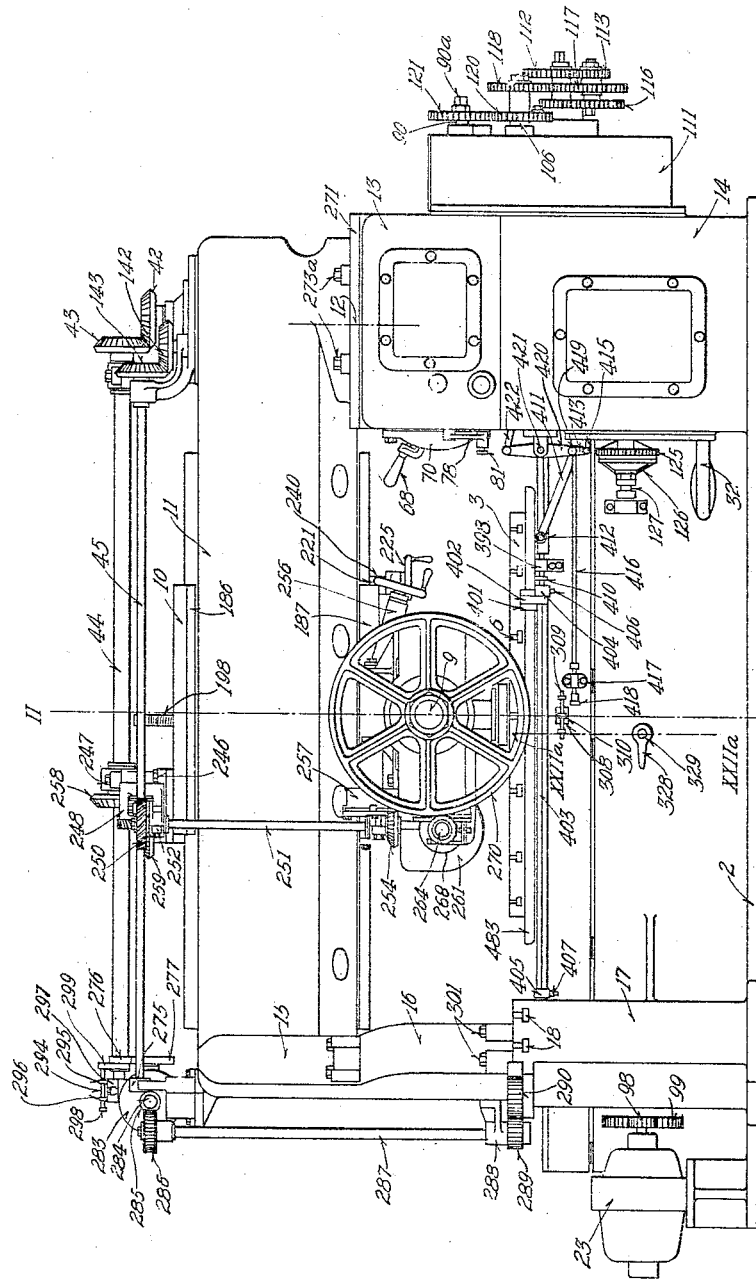
WITNESSES:
INVENTOR
Harry A. S. Howarth
BY
ATTORNEY H. A. S. HOWARTH.
GEAR CUTTING MACHINE.
APPLICATION FILED FEB. 17, 1915.
1,286,327.
Patented Dec. 3, 1918.
23 SHEETS—SHEET 5.
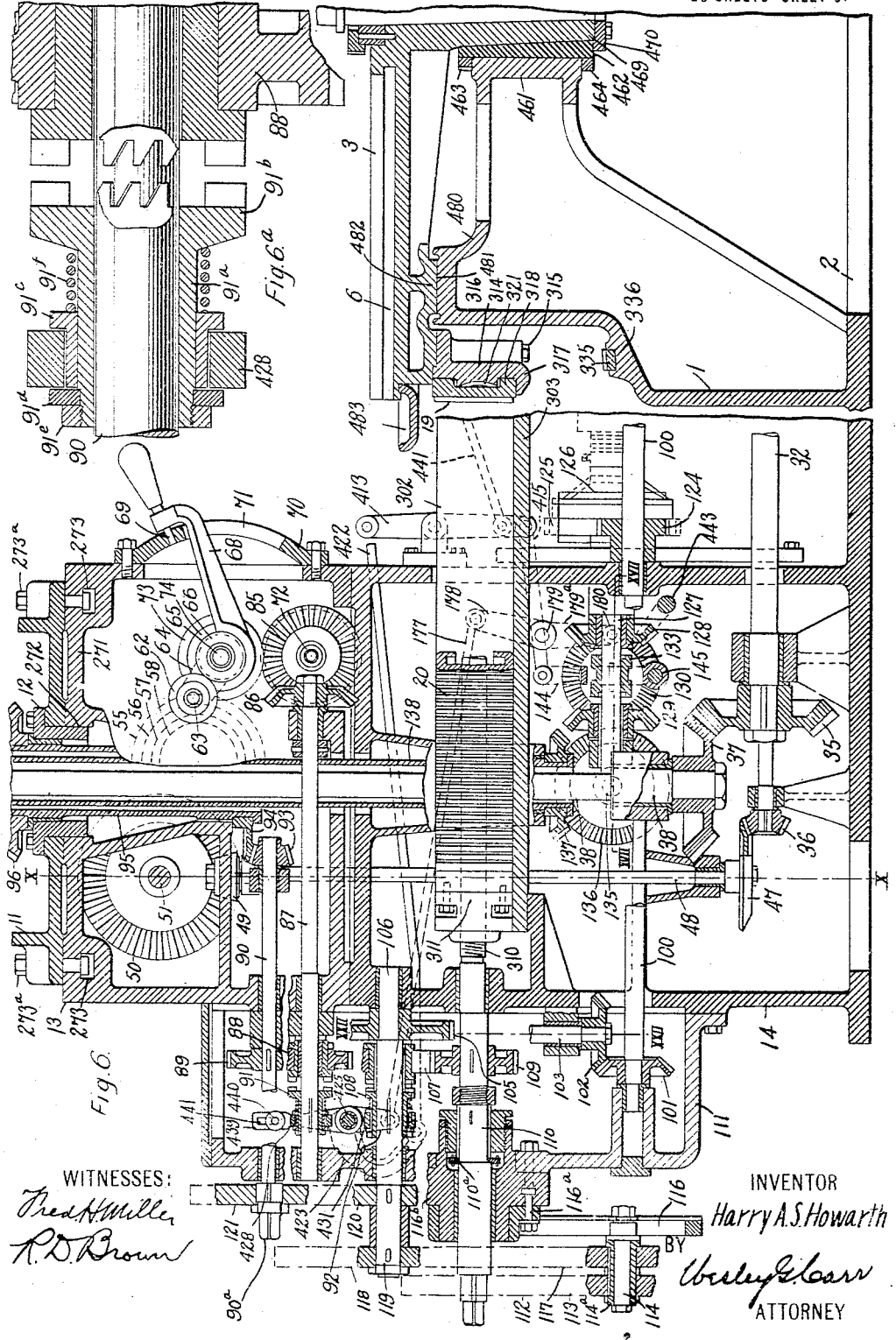
WITNESSES:
Fred H. Miller
R. D. Brown
INVENTOR
Harry A. S. Howarth
BY
Wesley G. Carr
ATTORNEY

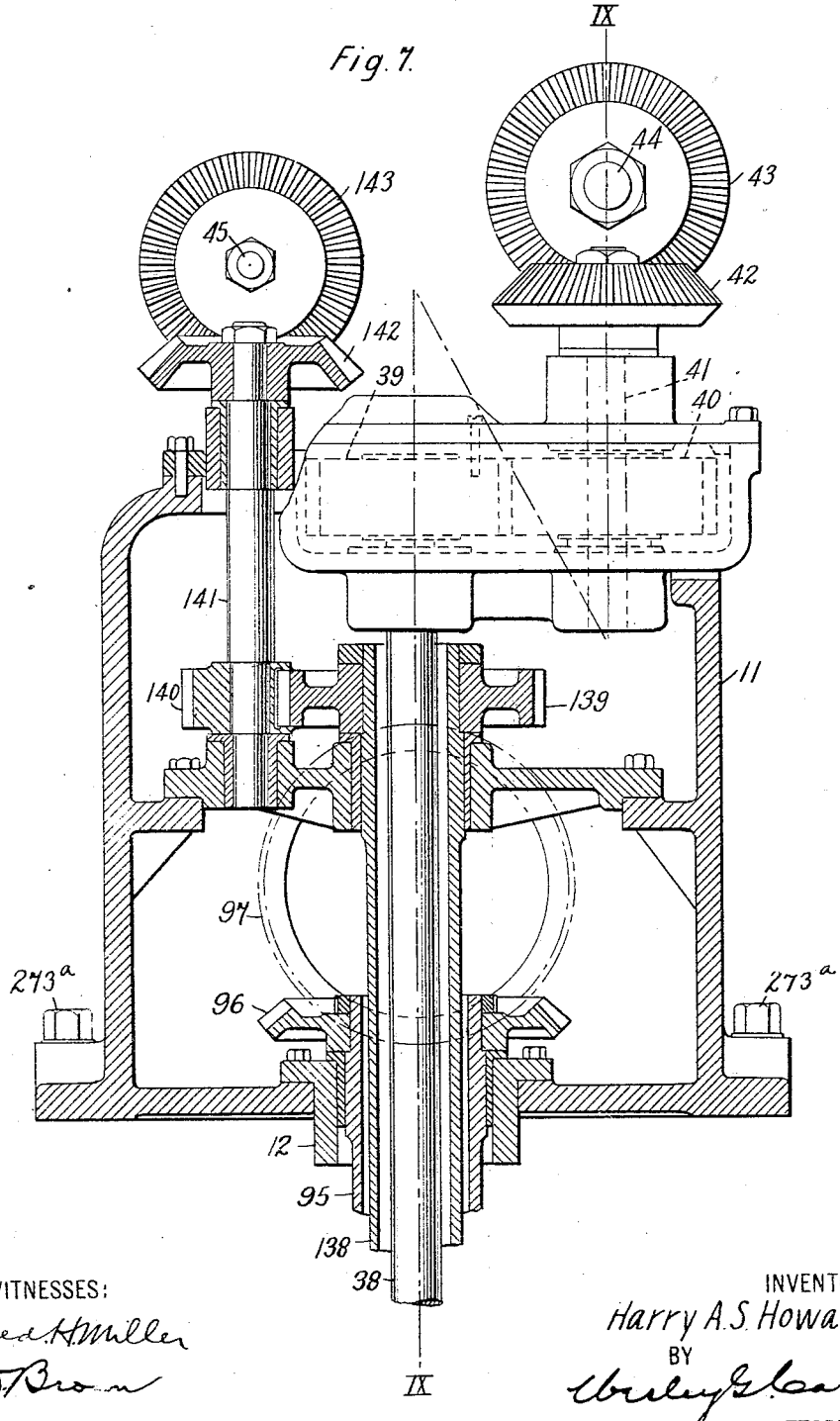

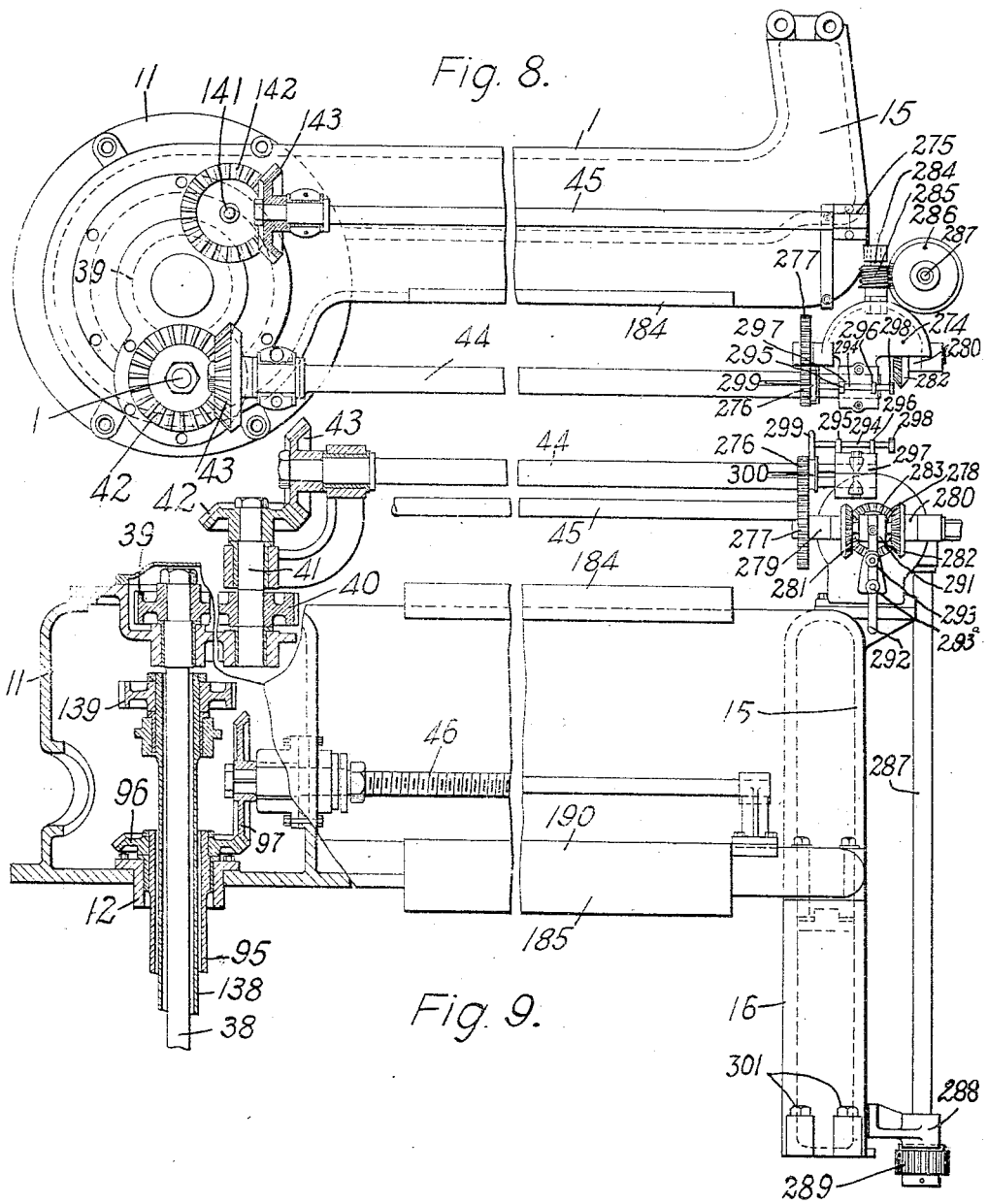

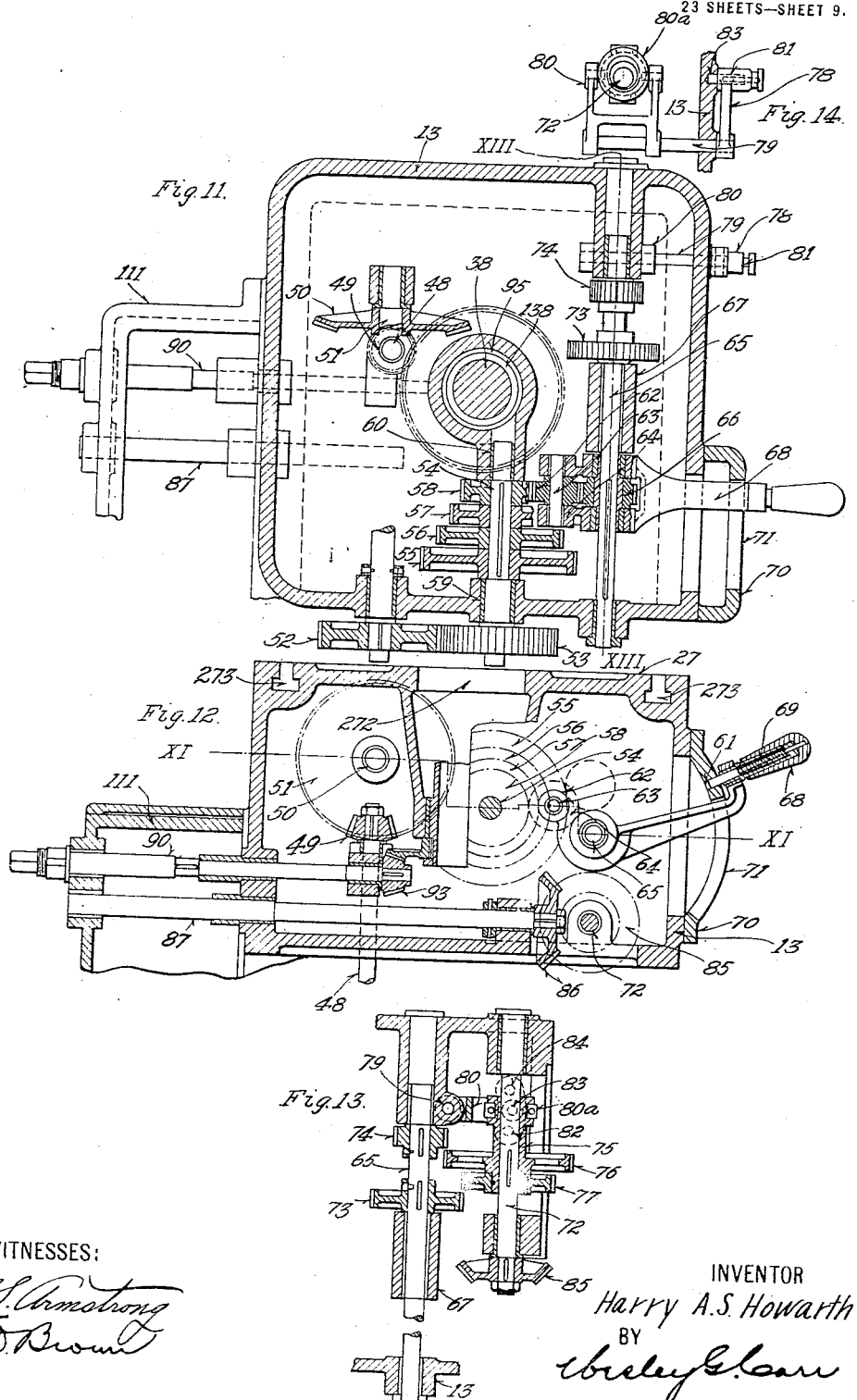

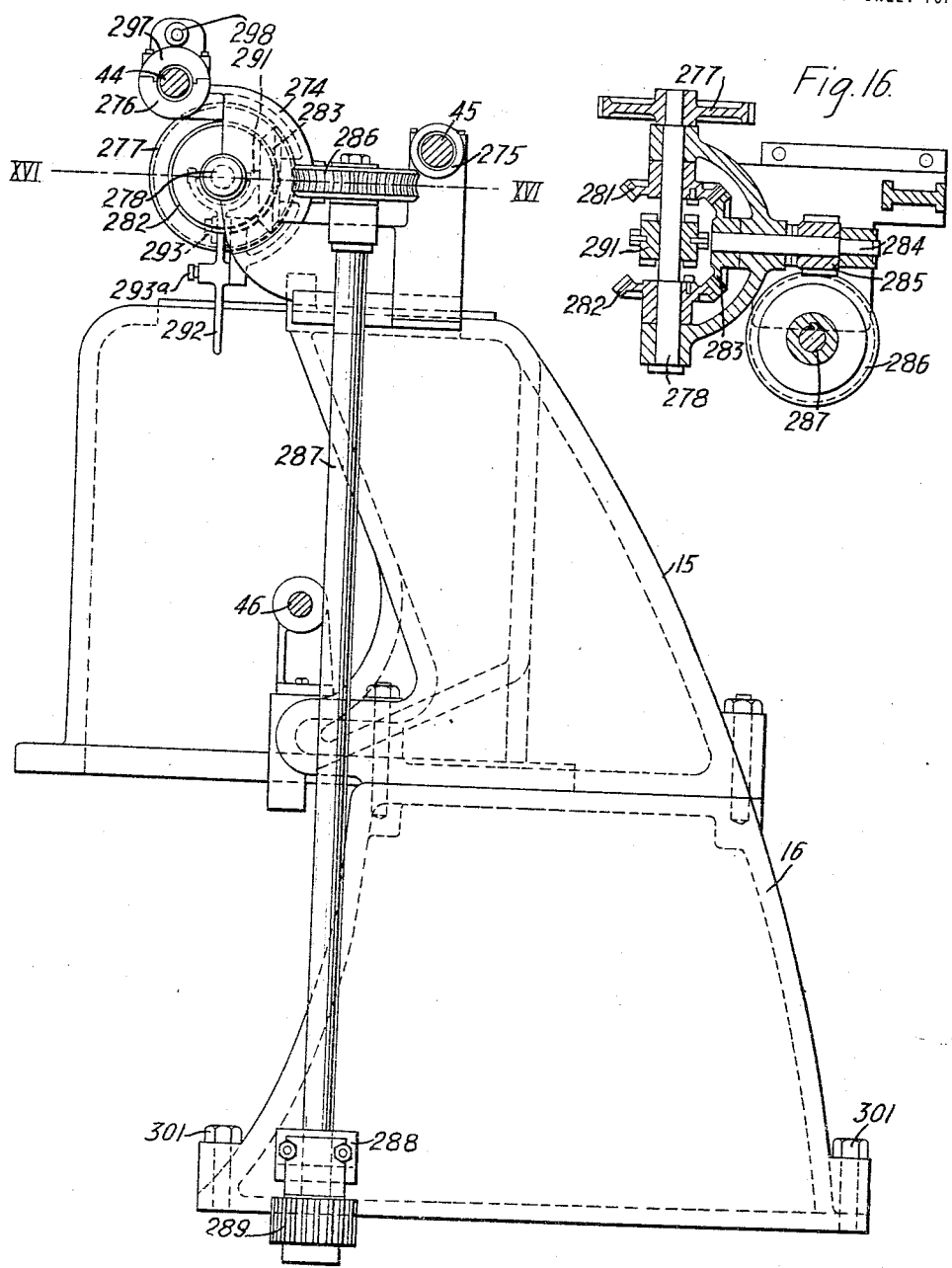

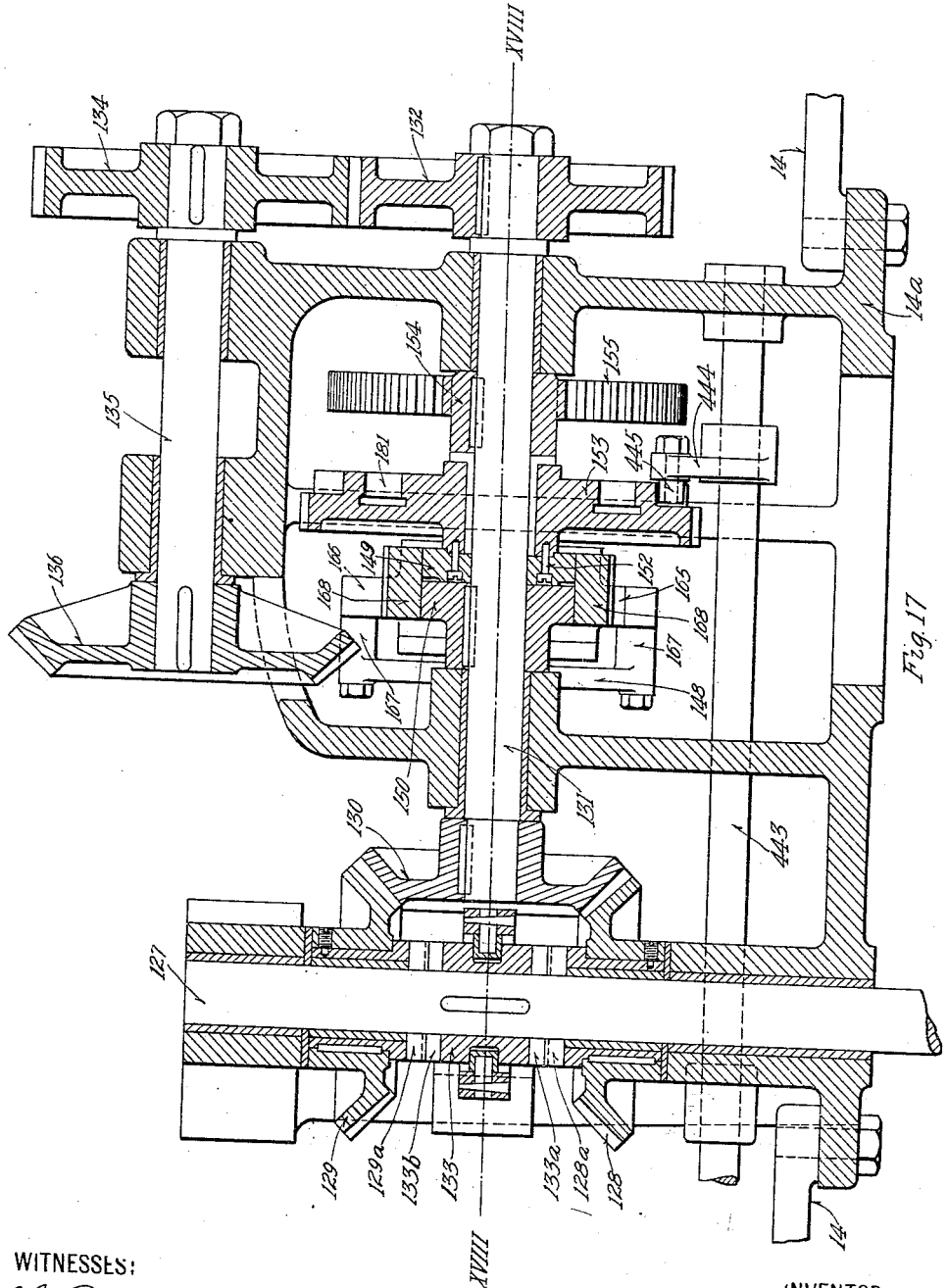

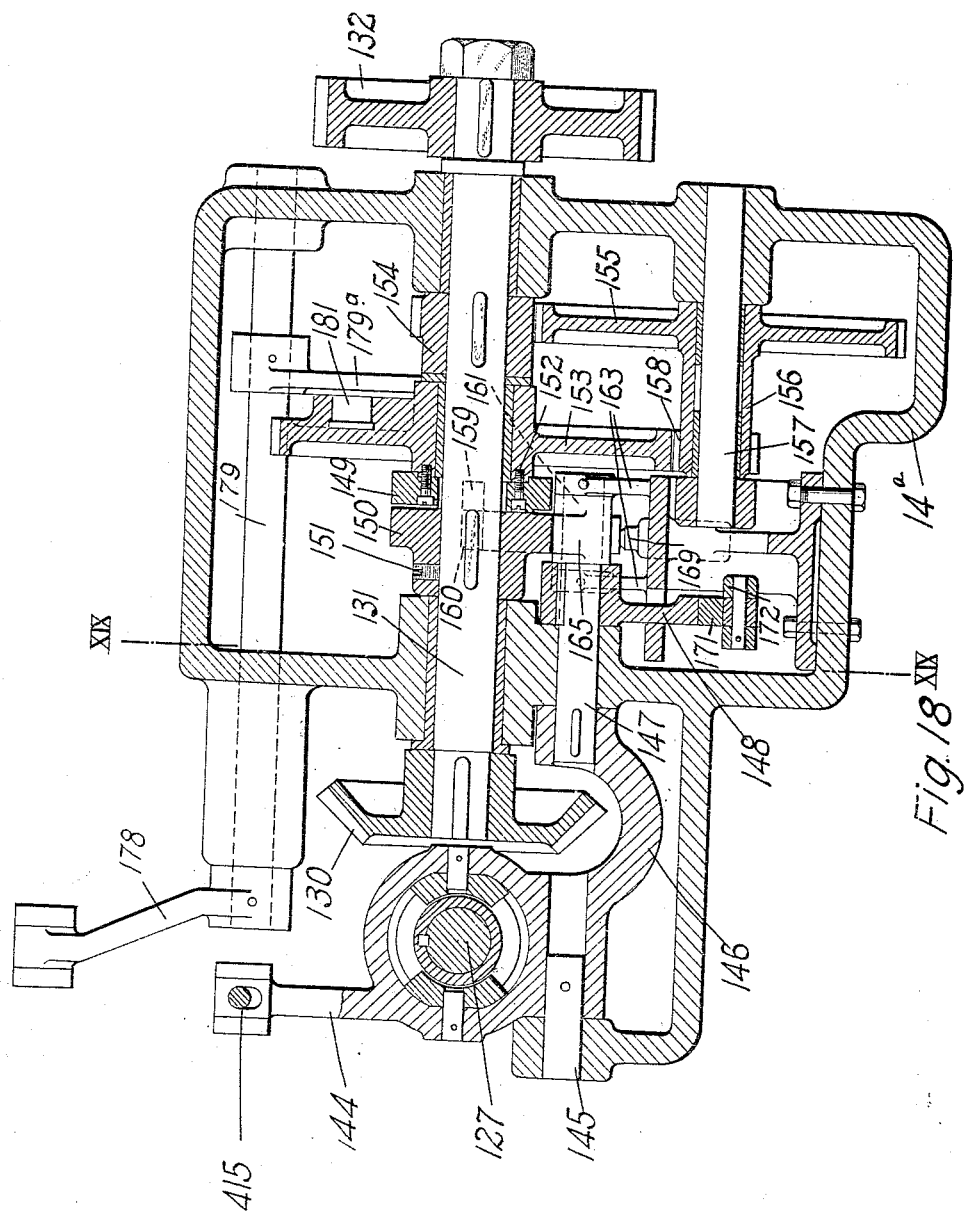

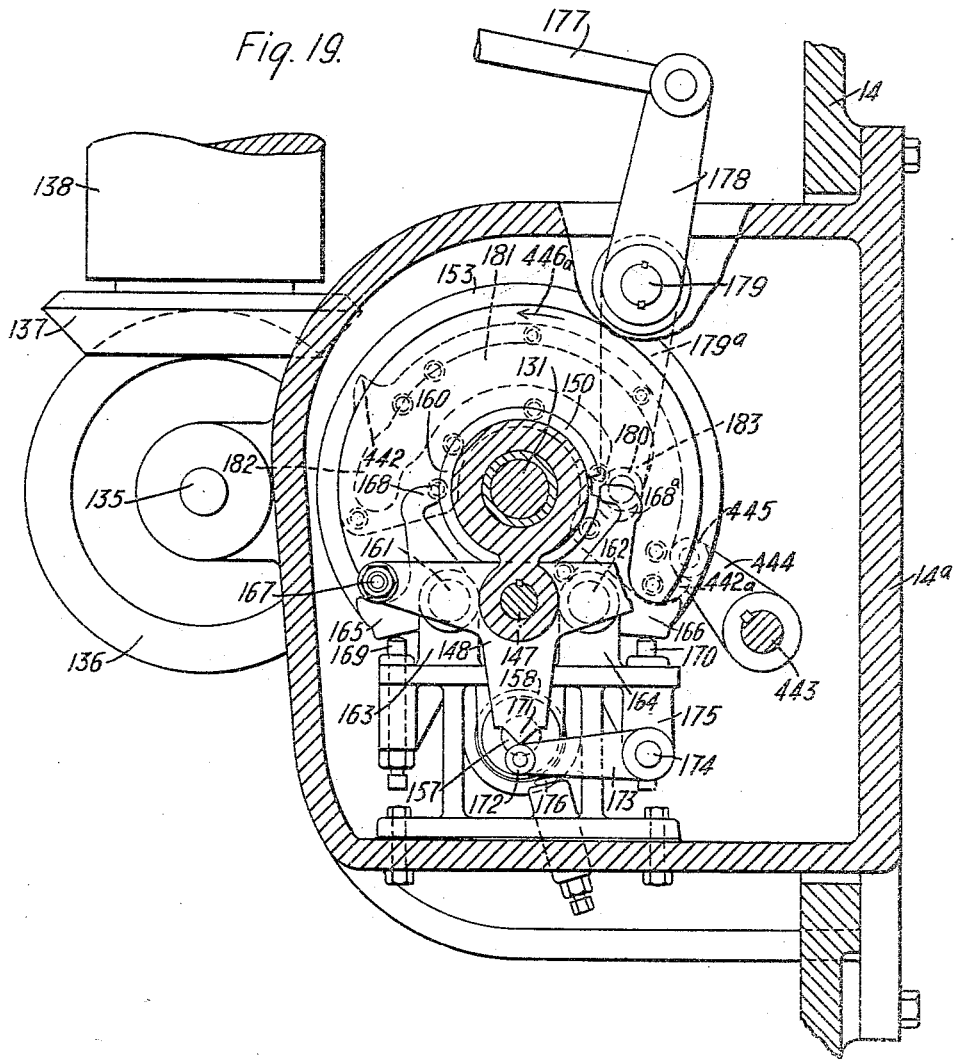

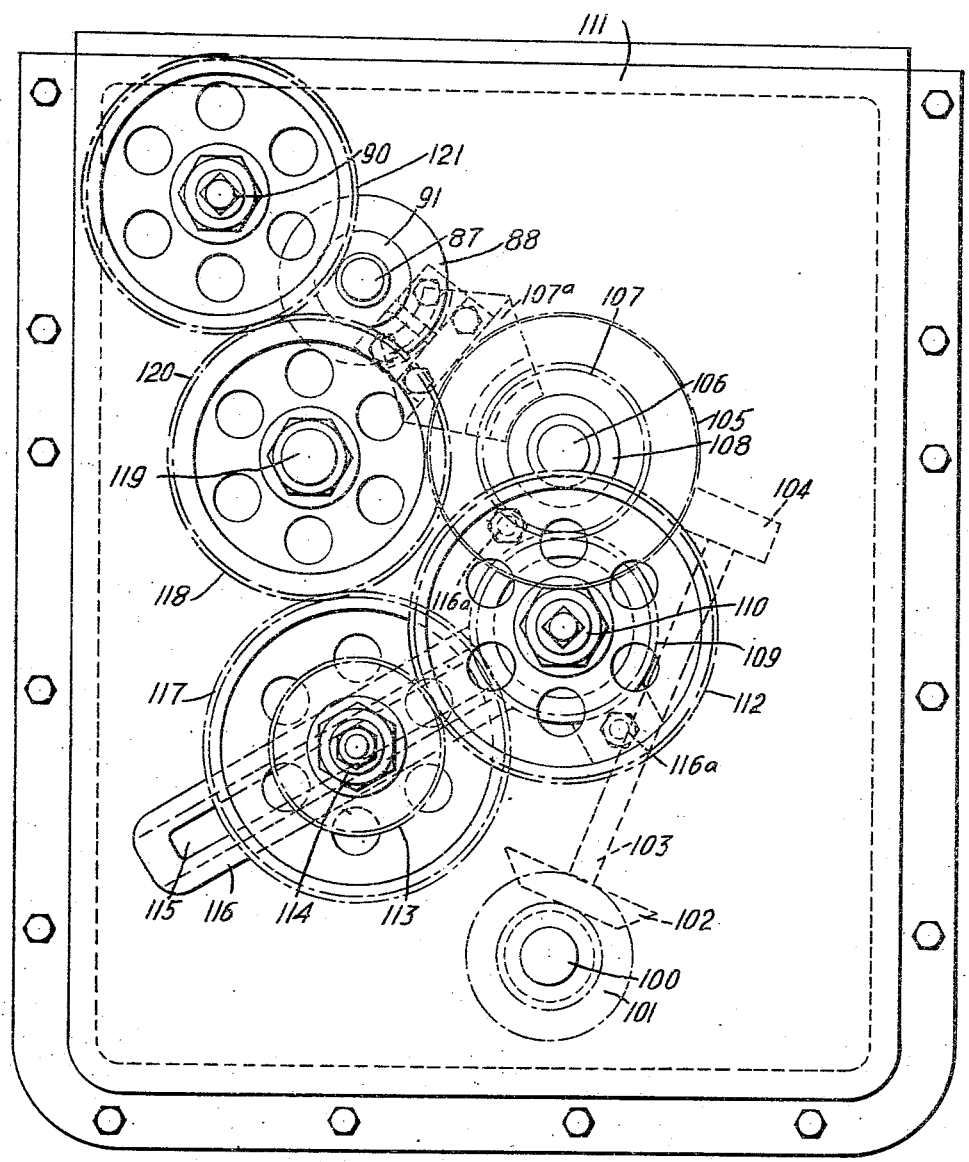

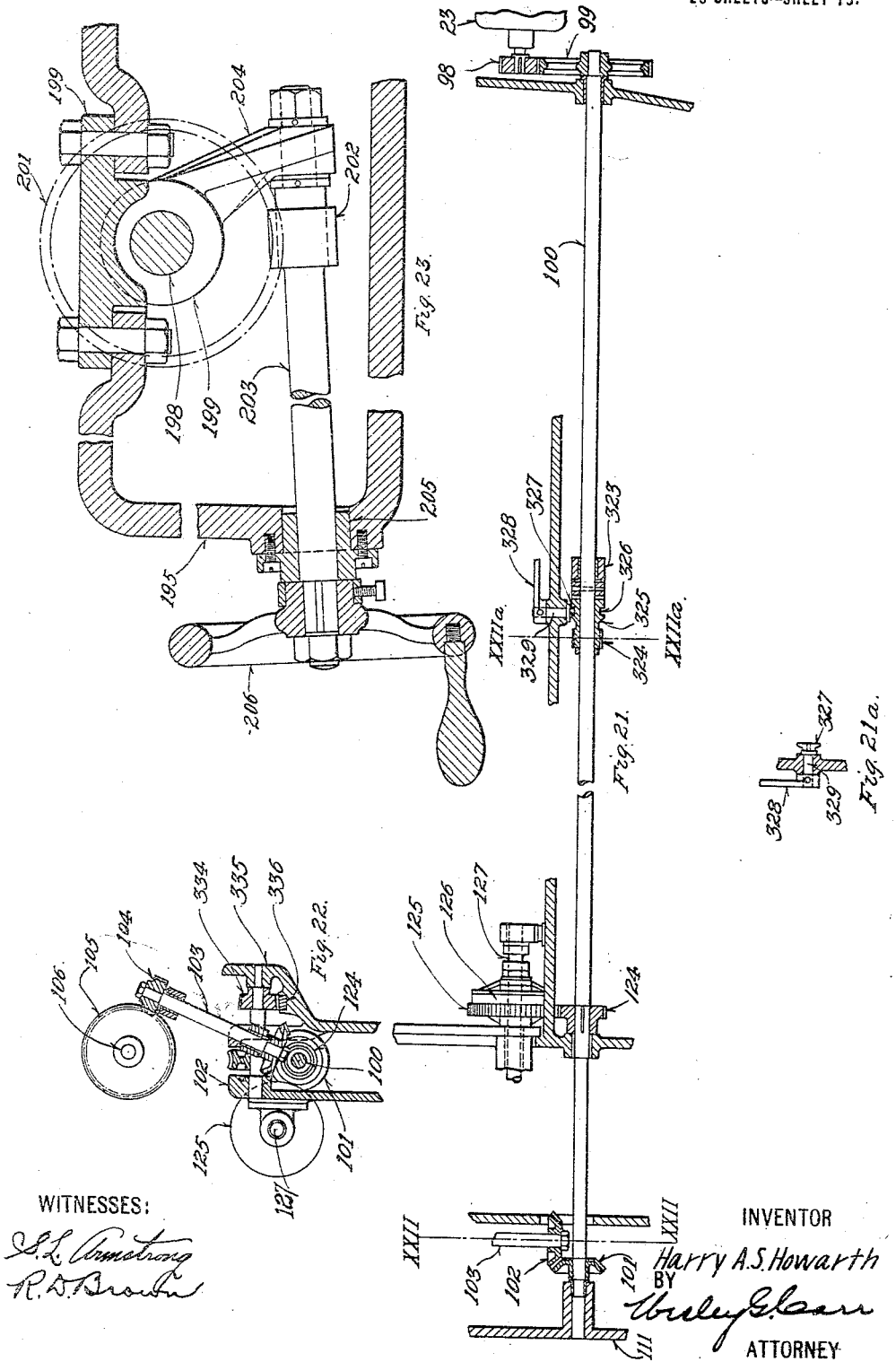

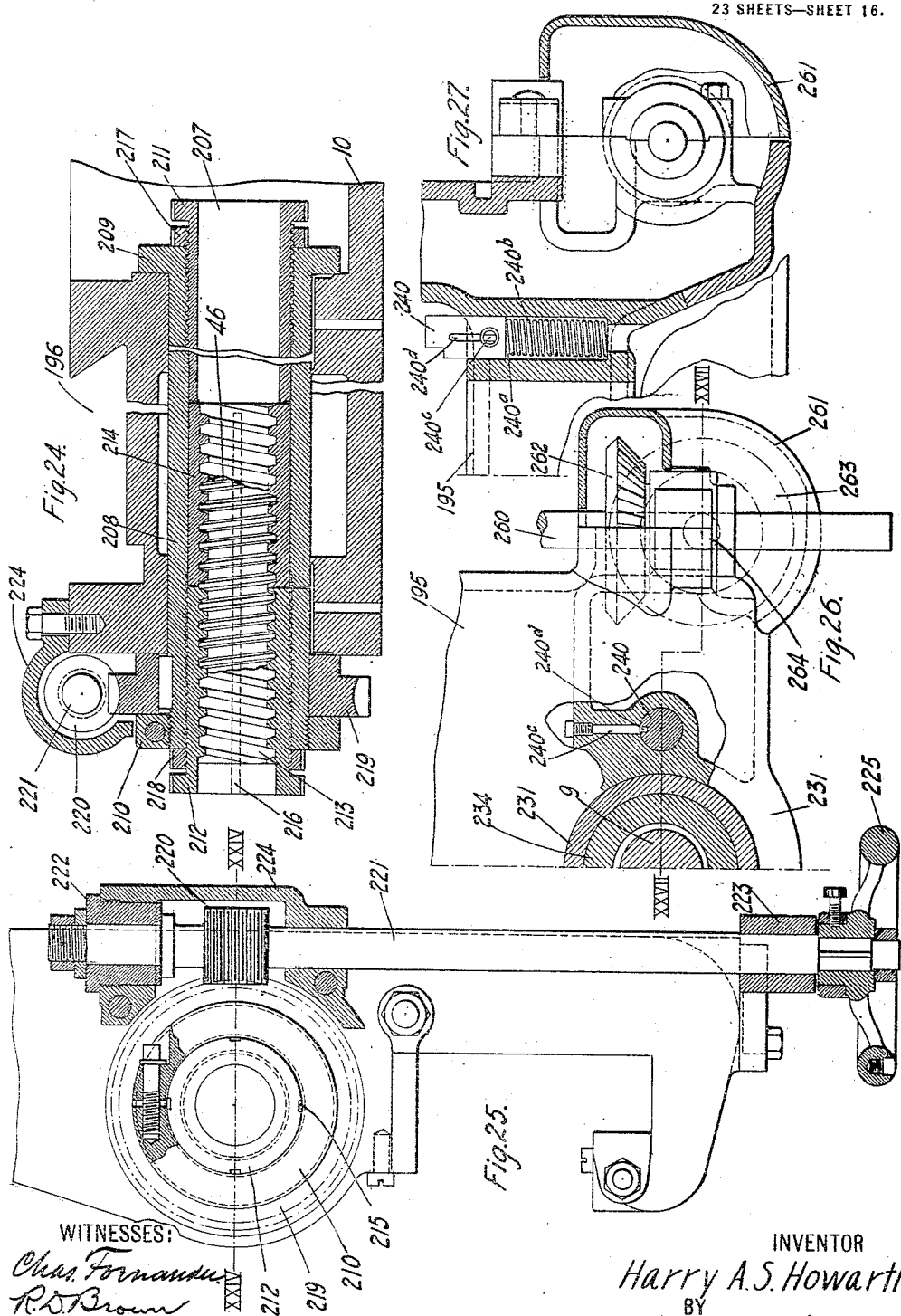

H. A. S. HOWARTH.
GEAR CUTTING MACHINE.
APPLICATION FILED FEB. 17, 1915.
1,286,327.
Patented Dec. 3, 1918.
23 SHEETS—SHEET 17.
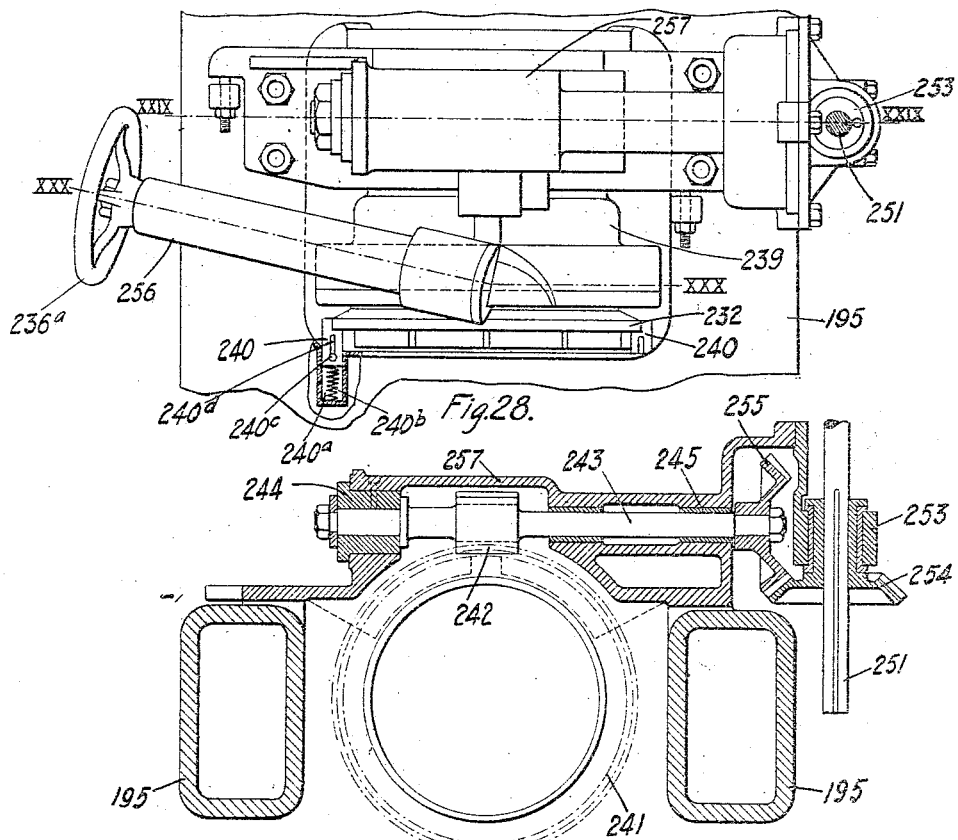
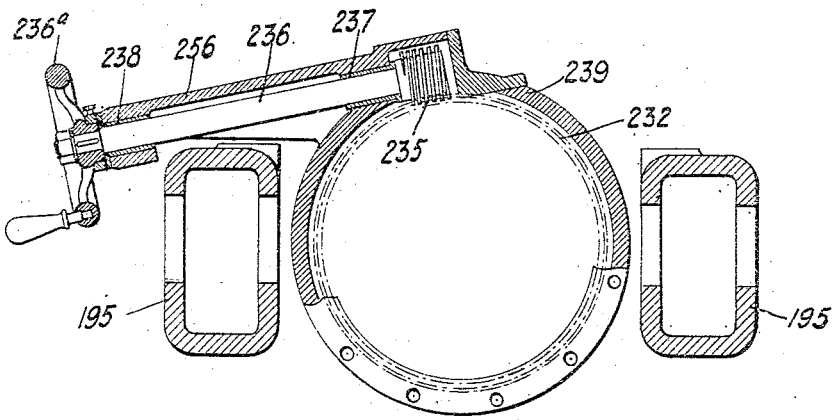
WITNESSES:
Chas. Fornander
R. D. Brown
INVENTOR
Harry A. S. Howarth
BY
Wesley G. Carr
ATTORNEY

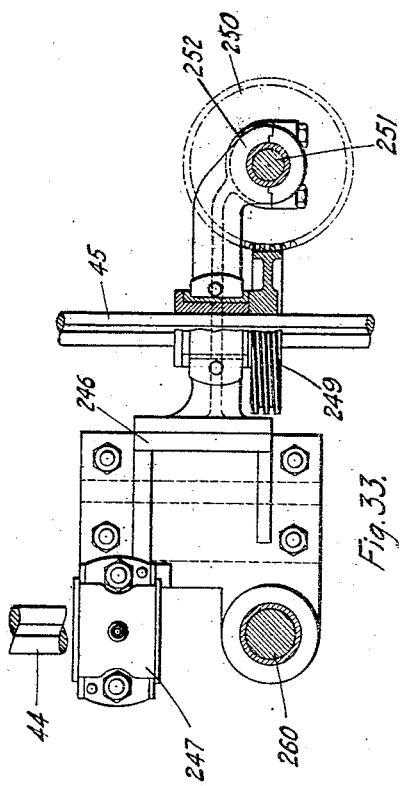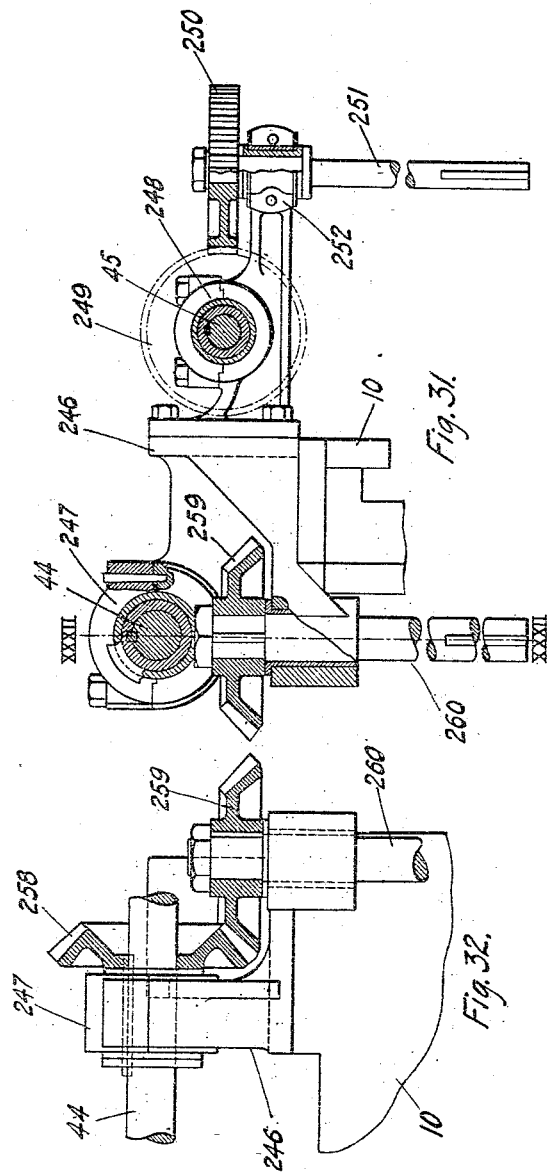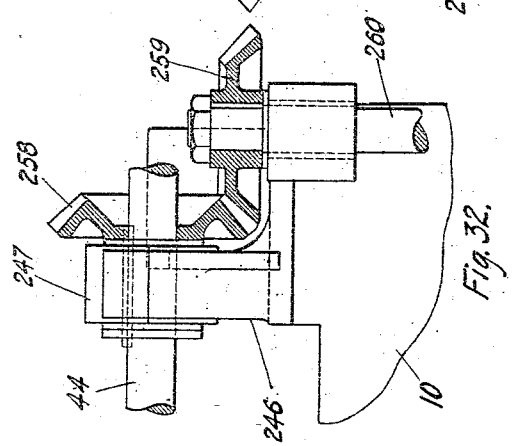

H. A. S. HOWARTH.
GEAR CUTTING MACHINE.
APPLICATION FILED FEB. 17, 1915.
1,286,327.
Patented Dec. 3, 1918.
23 SHEETS—SHEET 19.
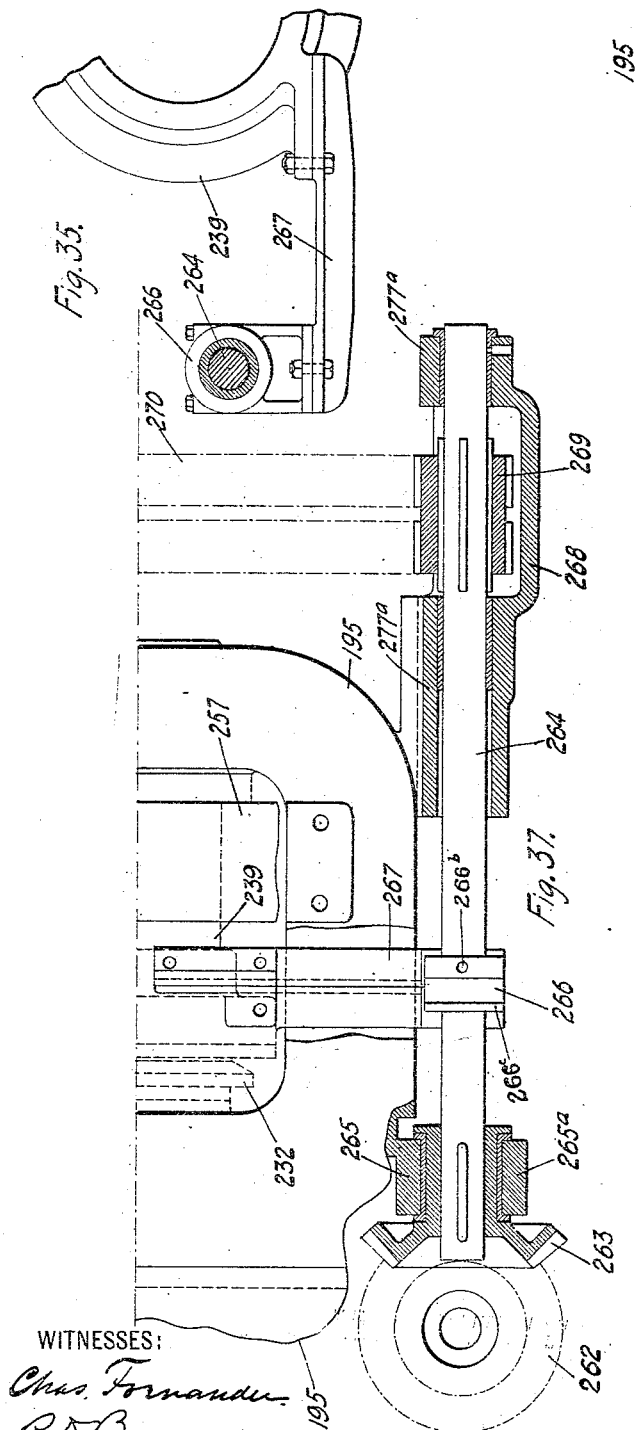
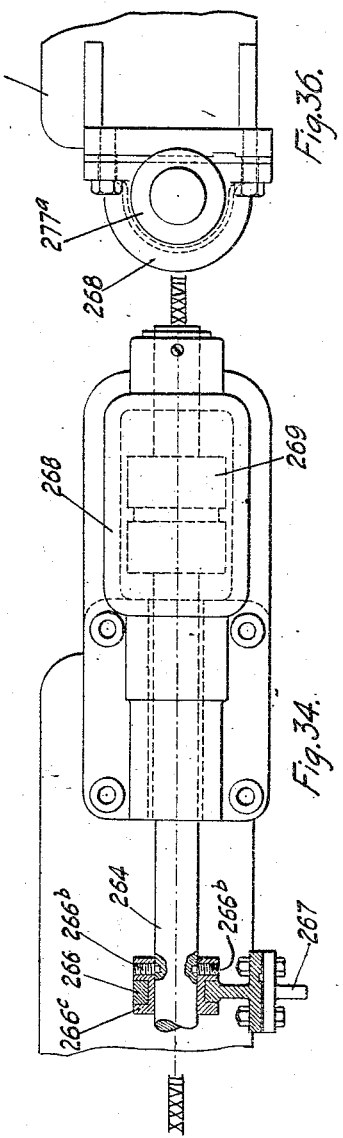
WITNESSES:
Chas. Fornander
R. D. Brown
INVENTOR
Harry A. S. Howarth
BY
Wesley G. Carr
ATTORNEY

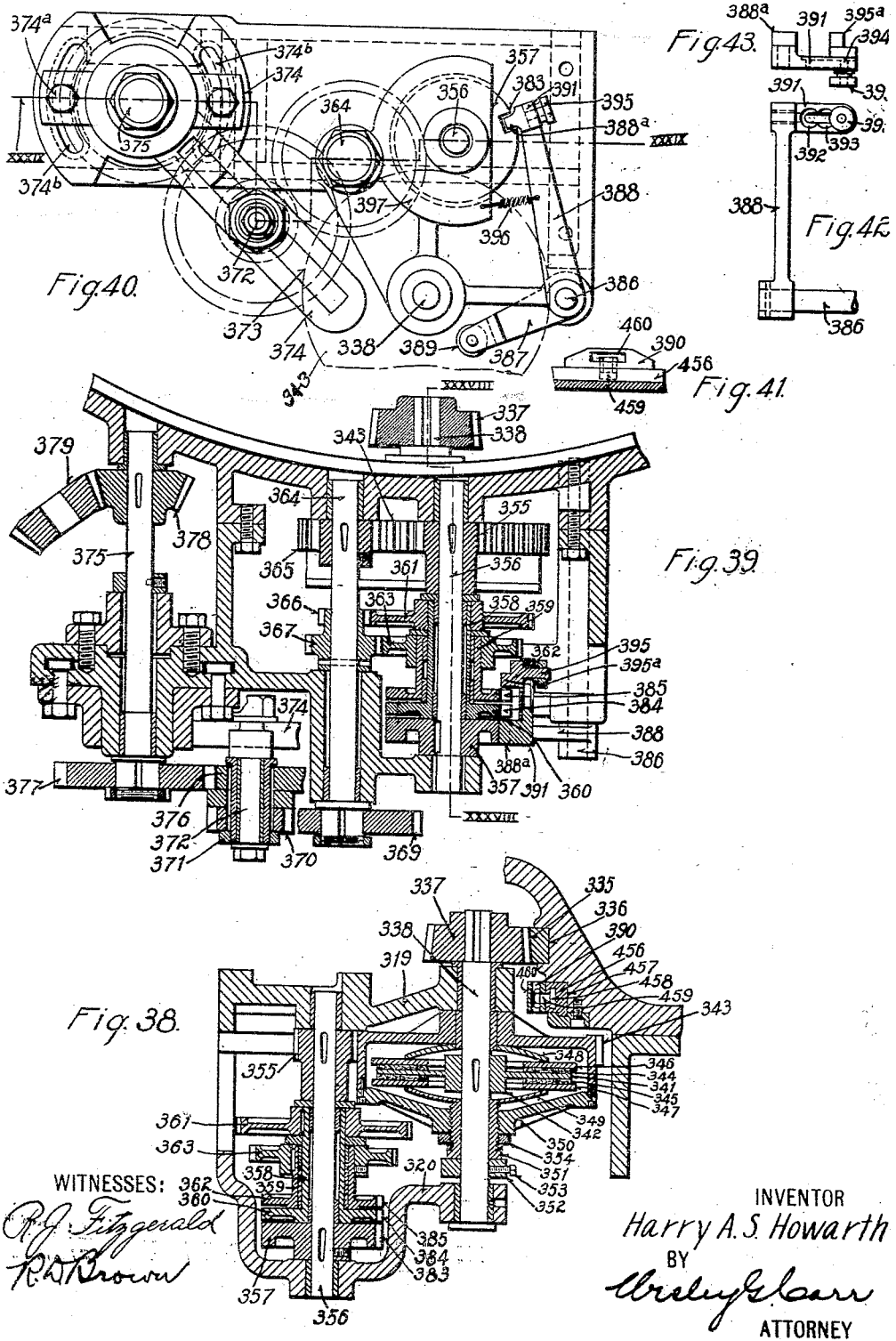

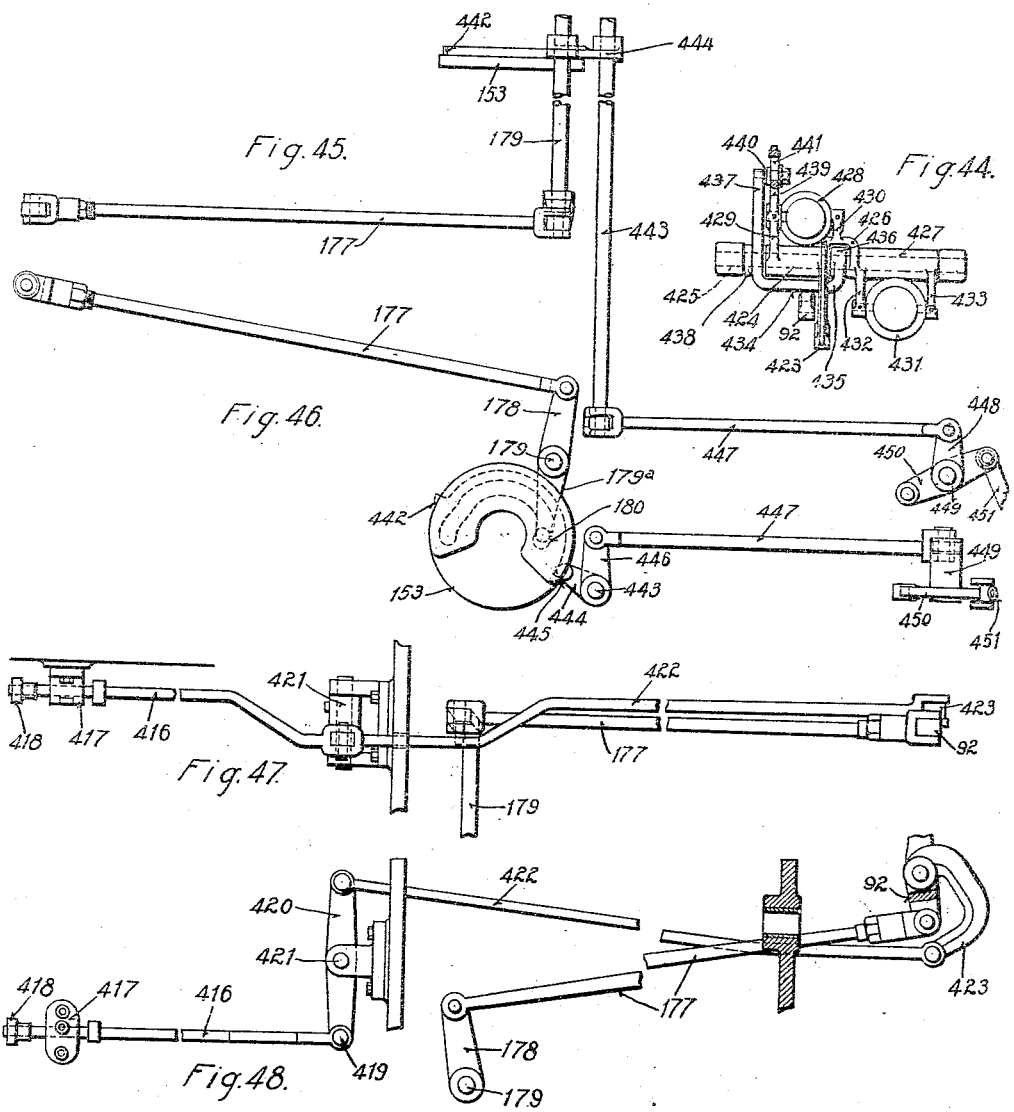

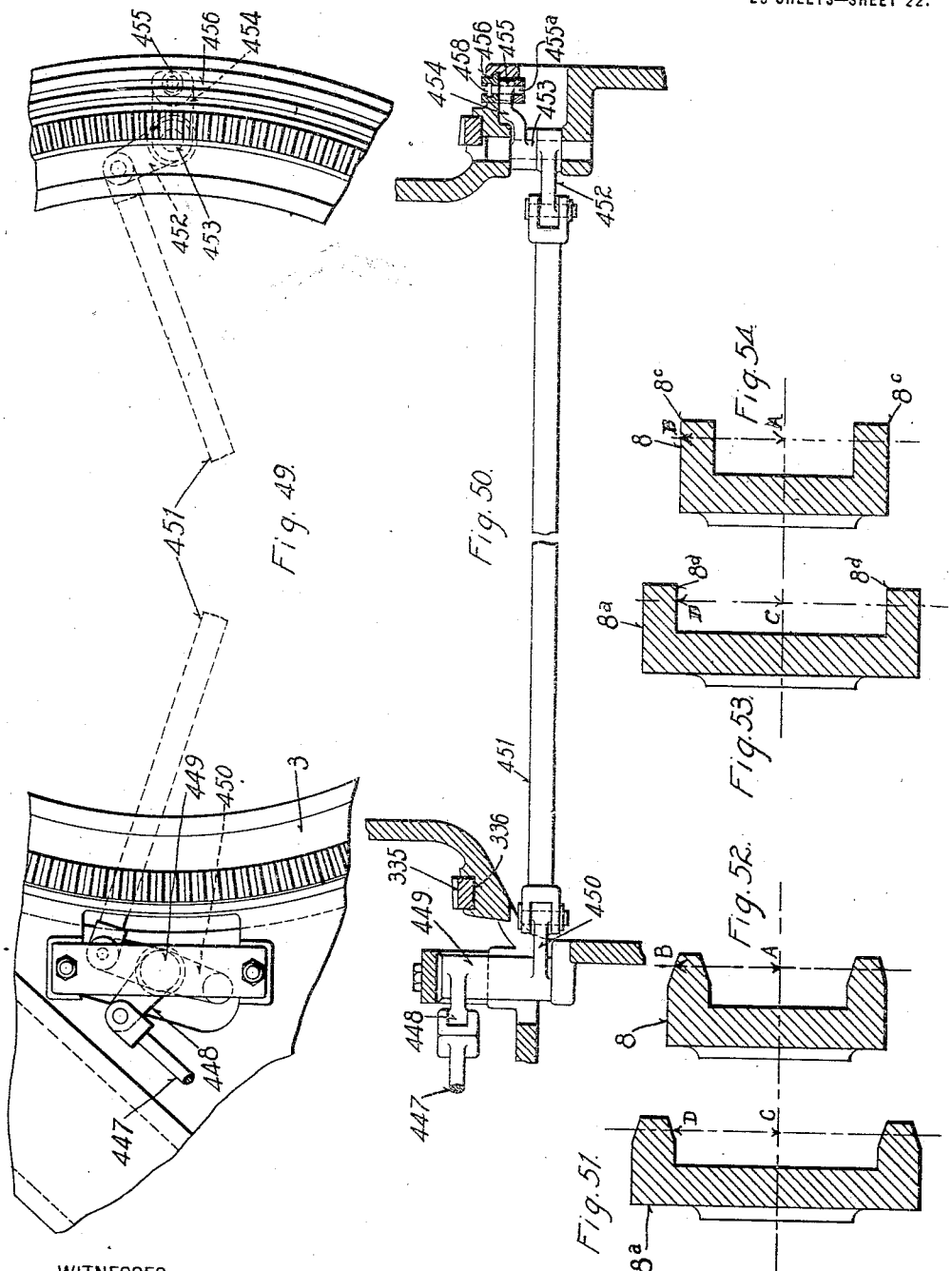

H. A. S. HOWARTH.
GEAR CUTTING MACHINE.
APPLICATION FILED FEB. 17, 1915.

1,286,327.

Patented Dec. 3, 1918.
23 SHEETS—SHEET 23.

WITNESSES:
R. J. Fitzgerald
R. D. Brown

INVENTOR
Harry A. S. Howarth
BY
Wesley G. Carr
ATTORNEY

UNITED STATES PATENT OFFICE.

HARRY A. S. HOWARTH, OF PITTSBURGH, PENNSYLVANIA, ASSIGNOR, BY MESNE ASSIGNMENTS, TO GLEASON WORKS, OF ROCHESTER, NEW YORK, A CORPORATION OF NEW YORK.

GEAR-CUTTING MACHINE.

1,286,327. Specification of Letters Patent. Patented Dec. 3, 1918.

Application filed February 17, 1915. Serial No. 8,868.

*To all whom it may concern:*

Be it known that I, HARRY A. S. HOWARTH, a citizen of the United States, and a resident of Pittsburgh, in the county of Allegheny and State of Pennsylvania, have invented a new and useful Improvement in Gear-Cutting Machines, of which the following is a specification.

My invention relates to gear-cutting machines, and it has special reference to machines for forming gear wheels having teeth that are of continuously curved contour across the full face of the wheel.

One object of my invention is to provide a machine by means of which gear teeth of the above-indicated form may be generated accurately and rapidly.

Another object of my invention is to provide a machine for cutting gear teeth of the above-indicated character upon gear blanks of relatively large pitches and diameters.

A further object of my invention is to provide novel indexing mechanism for rotating the gear blank step by step as the successive teeth are generated thereon.

A still further object of my invention is to provid an effective machine for cutting teeth of the above-indicated character which shall be wholly automatic in operation and which may be readily adjusted to cut teeth of various pitches and degrees of curvature upon blanks of different widths and diameters.

Ordinary spur gearing, in which the meshing gear teeth engage each other along straight lines parallel to the axes of the gears, have certain well-known disadvantages which render them unsuitable for the transmission of power at high speeds, and for such service it is therefore common to employ twisted or helical gear wheels, in which the load is distributed over several teeth and comes upon them gradually. Of these, gear wheels having double-helical or herringbone teeth are the most satisfactory, because the side thrusts on both sides of the median planes of such gear wheels are balanced against each other, but it has been found that gear wheels of this type cannot be cut without providing a central groove in the face of the gear blank, in order to allow sufficient clearance for the cutting tools, or without otherwise leaving the apex defective as to tooth action. The apexes of the teeth are consequently quite useless in transmitting power.

Attempts have been made to manufacture gear wheels having continuously curved or crescent-shaped teeth, and these are known in the art as "circular herringbone" gears. Such gear wheels are superior, in tooth strength and facility of lubrication, to double-helical and other forms of twisted gearing, but none of the machines that have been devised heretofore are capable of generating curved teeth both accurately and rapidly.

According to my present invention, I provide a machine for generating continuously curved gear teeth, of the kind just described, in which a rotating and bodily movable end milling tool is brought into cutting engagement with the face of a gear blank that is rotatably supported upon an axis perpendicular to the direction in which the cutting tool moves. In order that the slots between the teeth may be uniform in depth from end to end, I cause the tool and the blank to move together during the operation of cutting each tooth, the blank being rotated upon its axis, and the tool caused to move laterally in a line perpendicular to both the axis of the blank and the axis of rotation of the cutting tool. The mutual rolling movement between the cutting tool and the blank is similar to that which takes place between a coöperating rack and pinion. The movement of the gear blank is analogous to that of the pinion, and the bodily movement of the cutting tool is analogous to that of a rack tooth. After each tooth is generated in the manner just described, the cutting tool is withdrawn from engagement with the blank, and the tool and the blank are returned to their initial positions. During the reverse movements of the tool and the blank, the gear blank is caused to rotate, by means of a novel indexing device, into the proper position for forming the next tooth.

My machine may be operated to practise the method of cutting gears that is described and claimed in an application of Joseph C. O'Brien, Serial No. 879,505, filed December 29, 1914, and assigned to the R. D. Nuttall Company.

Figure 10:
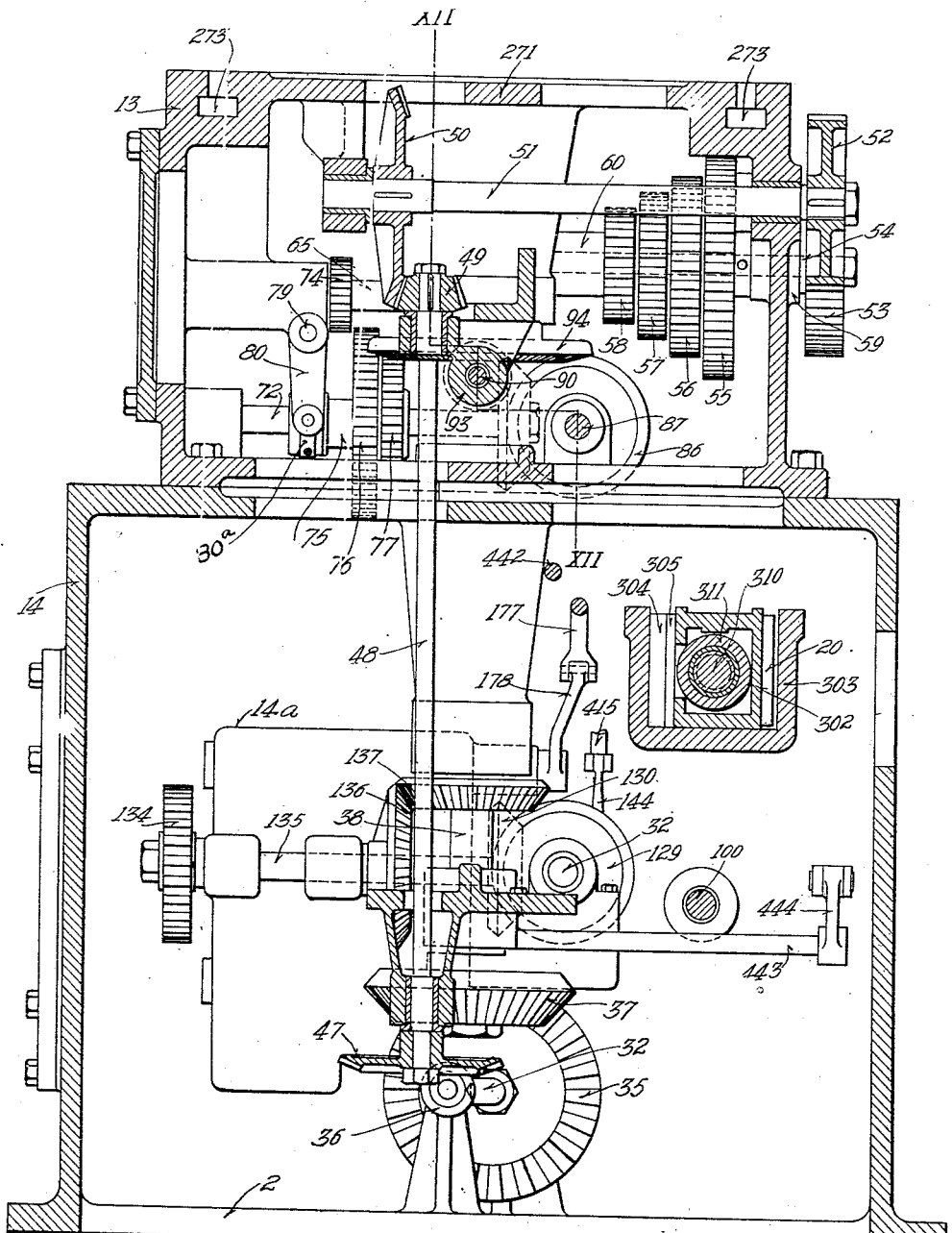

For a better understanding of my invention, reference may now be had to the accompanying drawings, in which Figure 1 is a plan view, with parts in section, showing the general arrangement of my machine; Fig. 2 is a vertical sectional view through the blank-supporting table, the tool saddle and the indexing mechanism, the section being taken substantially along the line II—II, Fig. 4 and Fig. 5; Fig. 3 is a side elevational view of the tool saddle and the tool-operating mechanism; Fig. 4 is a front elevational view of the machine, showing a partially cut gear blank in position thereon; Fig. 5 is a rear elevational view of the machine; Fig. 6 is a vertical sectional view taken substantially along the line VI—VI, Fig. 1; Fig. 6$^a$ is an enlarged sectional view of the clutch appearing in Fig. 6; Fig. 7 is a fragmentary end view of the machine, partly in elevation and partly in section, showing the manner in which power is distributed to the various horizontal operating shafts; Fig. 8 is a plan view of the parts shown in Fig. 9; Fig. 9 is a side elevational view, partially in section, showing the rail that carries the tool saddle, together with the operating mechanism therefor, and the rail-adjusting mechanism, the section being taken substantially along the line IX—IX, Fig. 7; Fig. 10 is a vertical view, partly in side elevation and partially in section, of a portion of the parts shown in Fig. 6, the section being taken substantially along the line X—X, Fig. 6; Fig. 11 is a horizontal sectional view taken substantially along the line XI—XI, Fig. 12; Fig. 12 is a vertical sectional view taken substantially along the line XII—XII, Fig. 10; Fig. 13 is a vertical sectional view taken substantially along the line XIII—XIII, Fig. 11; Fig. 14 is an end elevational view of the gear-shifting mechanism shown in Fig. 13; Fig. 15 is a side elevational view, on an enlarged scale, of the structure shown at the right of Figs. 8 and 9; Fig. 16 is a horizontal sectional view of the structure shown at the top of Fig. 15, the section being taken substantially along the line XVI—XVI, Fig. 15; Fig. 17 is a horizontal sectional view taken substantially along the line XVII—XVII, Fig. 6; Fig. 18 is a vertical sectional view taken substantially on the line XVIII—XVIII, Fig. 17; Fig. 19 is a vertical sectional view of a portion of the mechanism shown in Figs. 17 and 18, the section being taken substantially along the line XIX—XIX, Fig. 18; Fig. 20 is a side elevational view of the change gearing shown at the left of Fig. 4; Fig. 21 is a horizontal view, partly in plan and partly in section, showing the secondary power transmitting shaft and the various means for taking power therefrom; Fig. 21$^a$ is an elevational view showing the details of the clutch-shifting lever shown in Fig. 21; Fig. 22 is a vertical sectional view, taken partially along the lines XXII—XXII, Figs. 6 and 21; Fig. 23 is a horizontal view, partly in plan and partly in section, taken on the line XXIII—XXIII, Fig. 2, of the mechanism for effecting the vertical adjustment of the tool spindle; Fig. 24 is a horizontal sectional view, looking upward, showing the manner in which the tool saddle is adjustably mounted on its feed screw, the section being taken substantially along the line XXIV—XXIV, Fig. 25; Fig. 25 is a vertical elevational view of the parts shown in Fig. 24, as seen from the left in Fig. 24; Fig. 26 is a front elevational view, partially in section, of the parts shown in Fig. 27; Fig. 27 is a horizontal sectional view, on a scale somewhat larger than that of Fig. 26, of a portion of the knee casting and one of the buffer devices employed in connection with the reciprocating tool spindle, the section being taken substantially along the line XXVII—XXVII, Fig. 26; Fig. 28 is a plan view showing the manual and automatic mechanism for reciprocating the tool spindle in the direction of its axis; Fig. 29 is a vertical sectional view taken substantially along the line XXIX—XXIX, Fig. 28; Fig. 30 is a vertical sectional view taken substantially along the line XXX—XXX, Fig. 28; Fig. 31 is a side elevational view, with parts shown in section, of the upper portion of the tool saddle, showing the means for taking power from the power shafts for operating the cutting tool; Fig. 32 is a vertical sectional view taken substantially along the line XXXII—XXXII, Fig. 31; Fig. 33 is a plan view of the mechanism shown in Fig. 31; Fig. 34 is a side elevational view showing the mechanism for rotating the cutting tool spindle upon its axis; Fig. 35 is an end elevational view of the parts shown at the left of Fig. 34; Fig. 36 is an end elevational view of the parts shown at the right of Fig. 34; Fig. 37 is a horizontal sectional view taken substantially along the line XXXVII—XXXVII, Fig. 34; Fig. 38 is a vertical sectional view of a portion of the indexing mechanism, the section being taken substantially along the line XXXVIII—XXXVIII, Fig. 39; Fig. 39 is a horizontal sectional view of the indexing mechanism, the section being taken substantially along the line XXXIX—XXXIX, Fig. 38; Fig. 40 is a front elevational view of a portion of the mechanism shown in Fig. 39; Fig. 41 is a side elevational view showing the cam for operating the latch shown in Fig. 40; Fig. 42 is a side elevational view of the latch shown in Fig. 40; Fig. 43 is an end elevational view of the head of the lever shown in Figs. 40 and 42; Fig. 44 is an elevational view of the mechanism for operating the reversing clutches; Fig. 45 is a plan view of a portion of the clutch shifting and index operating mechanism; Fig. 46 is a side elevational view of the parts shown in Fig. 45; Fig. 47 is a plan view of part of the hand and the automatic control linkages for the reversing clutches; Fig. 48 is a side elevational view of the mechanism shown in Fig. 47; Fig. 49 is a fragmentary plan view showing a portion of the index-operating linkages; Fig. 50 is a side view, partially in elevation and partially in section, of the mechanism shown in Fig. 49; Figs. 51 and 52 are diagrammatic sectional views showing a pair of cutting tools adapted for use with my machine; Figs. 53 and 54 are diagrammatic sectional views similar to Figs. 51 and 52, showing a modified form of cutting tool adapted for use with my invention, and Figs. 55 to 59, inclusive, are diagrammatic views illustrating the successive movements of the cutting tool and the gear blank during the operation of the machine.

The general structure of the machine may best be understood by referring to Figs. 1, 2, 4 and 5 of the drawing. Standards 1 are mounted upon a base 2 and support a rotatable table 3 that is adapted to carry a gear blank 4, the gear blank being mounted on an arbor that is secured to rotate with the table. The blank may be held securely to the table in any suitable and well known manner, and is maintained in rigid horizontal position of the table by means of vertically adjustable jack screw supports 5—5 shown in Fig. 4. The supports 5 are slidably secured in radial T-slots 6 in the table 3 by means of inverted bolts and nuts 7. Disposed in operative relation to the gear blank 4 is a rotary end-milling tool 8 mounted on a rotating spindle 9 that is supported in a carriage or tool-saddle 10. The tool-saddle is slidably supported on a rail 11 that is pivotally mounted at 12 on the cover of a rectangular gear-box 13 bolted to the top of a frame or casing 14, which rests on the base 2 at the left of the machine, as seen in Fig. 4. The other end 15 of the rail is bolted to a support or housing 16 which rests slidably on a curved and slotted track 17, shown in Figs. 1 and 4, and which may be clamped upon the track by inverted T-bolts, the heads of which travel in curved T-shaped slots 18 in the track 17. The table 3 is given an oscillating movement about its axis during the cutting of each gear tooth by means of a segmental rack 19 which is secured to the table 3 in a manner to be described hereafter, and which meshes with a reciprocating straight rack 20. Indexing mechanism, indicated generally by the numeral 21, is mounted on a ring which surrounds the table and of which the segmental rack 19 is a part and is located at the side of the table substantially opposite to the rail and the racks just described. The indexing mechanism is adapted to move with the table, as the latter is oscillated by means of the coöperating racks 19 and 20.

Power is supplied to all of the moving parts of the machine from two independent prime movers, which, as shown in Fig. 1, are a main electric motor 22 and an auxiliary electric motor 23. It will be obvious that any other suitable sources of power may be substituted for these motors. The various mechanisms of the machine, and the several means by which power is transmitted thereto will now be separately discussed and described in detail.

Referring to Fig. 1, the armature shaft of the motor 22 carries a pinion 24 meshing with a spur gear wheel 25 which, in turn, meshes with a spur gear wheel 26 mounted on a short horizontal shaft 27 that is carried eccentrically in a sleeve 28. The shaft 27 at its opposite end from the gear wheel 26 carries a pinion 29 meshing with a larger gear wheel 30 that is secured to a diagonal shaft 32 which is the primary power shaft of the machine. The gear wheels 29 and 26 may be engaged with or disengaged from the gear wheels 30 and 25 by means of a lever 33 that is secured to the sleeve 28 and is provided with suitable catches (not shown) for maintaining the lever, and consequently the sleeve 28, either in the position in which the gear wheels 29 and 26 mesh with the gear wheels 30 and 25 or in a position in which these gear wheels are disengaged. When the lever 33 is in the latter position, the gear wheel 25 may be secured directly to the diagonal shaft 32, by bolting it to a disk 34 that is keyed to the shaft 32. The gearing just described provides means for driving the shaft 32 at two different speeds, as will be apparent from an inspection of the sizes of the various gear wheels. The motor 22 has variable speed, and hence, together with mechanism just described gives many different speeds to the shaft 32. The shaft 32, as shown in dotted lines in Fig. 1, extends diagonally across the machine, and is provided at its outer end with two bevel gear wheels 35 and 36, also shown in Figs. 6 and 10.

Referring particularly to Figs. 6, 7, 8 and 9, the bevel gear wheel 35 meshes with a similar bevel gear wheel 37 that is secured to the lower end of a vertical shaft 38 which, at its upper end, carries a spur pinion 39. The pinion 39 meshes with a pinion 40 on a short vertical shaft 41 that carries at its upper end a miter gear wheel 42 meshing with a miter gear wheel 43 which is secured to one end of a horizontal shaft 44 that extends longitudinally above the rail 11. The shaft 44, it will be understood, is rotated constantly in the same direction during the operation of the machine. It supplies power for constantly rotating the tool spindle, and for rotating the rail about its pivot, when such adjustment is necessary to adapt the machine to operate upon gear blanks of different diameters.

A second horizontal shaft 45, Fig. 4, and a feed screw 46 also extend along the rail 11 parallel to the shaft 44 and supply power, respectively, for reciprocating the tool-spindle 9, in the direction of its axis, toward and from the gear blank, and for reciprocating the tool saddle 10 bodily along the rail. The shaft 45 is caused to rotate a definite number of times in one direction, in order to advance the cutting tool into engagement with the gear blank. This shaft is maintained at rest during the cutting operation, and, after each tooth is completed, it is caused to rotate the same number of times in the reverse direction in order to withdraw the tool. The feed screw 46 is caused to rotate similarly in opposite directions, and it thereby moves the tool-saddle slowly along the rail in its working stroke, when the cutting tool is in engagement with the gear blank, and then returns the tool-saddle rapidly to its initial position after the tool has been withdrawn from engagement with the blank. The feed screw 46 is driven in the proper direction to move the tool-saddle in its working stroke by power derived from the diagonal shaft 32, driven by the motor 22, while its reverse rotation is effected by power derived from the small motor 23. Both the advance and withdrawal of the cutting tool toward and from the work are effected by power derived from the auxiliary motor 23. The mechanisms for impressing these successive rotations upon the feed screw 46 and the shaft 45 will now be more particularly described.

As stated above, the diagonal main power shaft 32 carries at its outer reduced end a bevel pinion 36. As shown in Figs. 6 and 10, this bevel pinion meshes with a bevel gear wheel 47 that is secured to the lower end of a vertical shaft 48, to the upper end of which is secured a bevel pinion 49 that meshes with a bevel gear wheel 50 secured to a horizontal shaft 51. The shaft 51 extends to the front of the machine and carries at its forward end a spur gear wheel 52 meshing with a similar spur gear wheel 53 that is secured to a horizontal countershaft 54, to which is keyed a series of spur gear wheels 55, 56, 57 and 58, of decreasing diameters. The counter-shaft 54 is journaled near its outer end in a bearing 59 in the wall of the gear-box 13, and at its inner end in a bearing 60.

Referring now to Figs. 11, 12 and 13, any one of the series of spur gear wheels 55, 56, 57 and 58 is adapted to be engaged by a pinion 62 that is mounted on a short spindle 63 carried in a fork 64 which is loosely mounted on a horizontal shaft 65. Embraced between the two arms of the fork 64 is a spur pinion 66 which is slidably keyed to the shaft 65 and which meshes with the pinion 62. The movement of the fork 64 along the shaft 65 is limited in one direction by a bearing 67, which supports the shaft 65, and in the other direction by the casing of the machine, as clearly shown in Fig. 11. The fork 64 is provided with a handle 68, which, as shown in Figs. 6 and 12, is provided with a spring-pressed pin 69 that is adapted to enter any one of a series of holes 61 in a removable cover 70 bolted to the side of the gear-box 13, in order to fix the position of the pinion 62 in engagement with one of the gear wheels 55, 56, 57 and 58. An opening 71 in the cover 70 permits vertical rotation of the fork 64 about the shaft 65 as well as sliding movement along the shaft. It will be apparent from the foregoing description that the shaft 65 may be caused to rotate at any one of four speeds, by proper manipulation of the handle 68.

Fig. 13 shows the shaft 65 and the mechanism by which power is transmitted from this shaft to another horizontal shaft 72 disposed directly below it. Keyed to the shaft 65, at a little distance apart, are two pinions 73 and 74, the pinion 74 being smaller than the pinion 73. Secured to a sleeve 75 that is slidably keyed to the shaft 72 are two spur gear wheels 76 and 77, of which the gear wheel 77 is the smaller. The sleeve 75 is adapted to be moved along the shaft 72 by means of a shifting lever 78, shown in Figs. 2, 11 and 14, which is fixed on a pin 79 that carries a shifting-fork 80, which coöperates with the sleeve 75 through a shifting ring 80ª, as best shown in Fig. 13. The lever 78 is provided with a spring-pressed pin 81 that is adapted to enter a series of holes 82, 83 and 84 as shown in Fig. 2. It will be evident that when the lever 78 is moved to the left until the pin 81 enters the hole 82, the small gear wheel 77 will mesh with the gear wheel 73 on the shaft 65, and that similarly, when the lever 78 is moved to the right until the pin 81 enters the hole 84, the gear wheel 76 will mesh with the pinion 74. When the lever is in the intermediate position shown in Fig. 13, with the pin 81 received in the hole 83, neither of the gear wheels 76 and 77 is in mesh with the gear wheels on the shaft 65, and the shafts 65 and 72 are therefore operatively disconnected. The change-speed gearing operated by the levers 68 and 78 makes it possible to drive the shaft 72 at a wide variety of speeds, or to stop it entirely. Also, gears 52 and 53 may be replaced by others having different ratios, thus giving still more speeds to shaft 72. While the particular type of change-speed gearing just described is well suited to this purpose, it is to be understood that any other suitable change-speed mechanism may be substituted therefor.

Secured to the shaft 72, as best shown in Fig. 6, is a miter gear wheel 85 meshing with a miter gear wheel 86 that is secured to a horizontal shaft 87, upon which is loosely mounted a spur gear wheel 88. The gear wheel 88 meshes with a gear wheel 89, keyed to a horizontal shaft 90, which is provided with a squared outer end 90$^a$, to which a wrench may be applied in order to make adjustments in the machine. The gear wheel 89 is adapted to be secured to the shaft 87, for rotation therewith, by means of a clutch 91 that is intermittently operated by means of a pivoted shifting lever 92 in a manner to be described hereafter. The shaft 90 carries a bevel pinion 93 meshing with a bevel gear wheel 94 which is secured to the lower end of a tubular shaft 95 that surrounds the vertical shaft 38. Upon the upper end of the tubular shaft 95, as shown in Figs. 7 and 9, is a miter gear wheel 96 meshing with a miter gear wheel 97 that is secured to the end of the feed screw 46.

The rotation of the feed screw 46 in the reverse direction is effected by releasing the clutch 91 by which the gear wheel 88 is secured to the shaft 87 and then causing the shaft 90 to rotate in the opposite direction by means of power derived from the auxiliary motor 23 through the following mechanism. The armature shaft of the motor 23 carries a pinion 98 that meshes with a spur gear wheel 99 secured to one end of a horizontal shaft 100, best shown in Fig. 21, which extends nearly the full length of the machine and carries at its opposite end a miter gear wheel 101 meshing with a miter gear wheel 102 that is secured to the lower end of an inclined shaft 103, as shown in Figs. 6, 20 and 22. Upon the upper end of the inclined shaft 103 is a worm 104 meshing with a worm wheel 105 that is secured to a horizontal shaft 106 (see Figs. 6 and 20). A spur gear wheel 107 is loosely mounted on the shaft 106 and is adapted to be secured thereto by means of a clutch 108 that is intermittently operated by the shifting lever 92, which, as stated above, also operates the clutch 91. It will be evident from an inspection of Fig. 6 that the shifting lever 92 alternately operates the clutches 91 and 108, and that, when the gear wheel 107 is secured to the shaft 106, the gear wheel 88 is loose upon the shaft 87 and vice versa.

The clutch 91 is shown in detail in Fig. 6$^a$. It comprises the toothed gear wheel 88 and a sleeve 91$^a$, slidably keyed to the shaft 90 and provided with a toothed flange 91$^b$, the teeth of which are adapted to engage the clutch teeth upon the wheel 88. Slidably disposed upon the sleeve 91$^a$ is a second flanged sleeve 91$^c$, with which coöperates a washer 91$^d$ and a nut 91$^e$, which is screwed upon the threaded end of the sleeve 91$^a$. The flanged sleeve 91$^c$ and the washer 91$^d$ together form an annular groove that receives a clutch-shifting ring 428, which will be more particularly described hereafter in connection with Fig. 44 of the drawing, and to which is secured the clutch-shifting lever 92. Surrounding the sleeve 91$^c$ between the flanges of the sleeves 91$^a$ and 91$^c$ is a helical compression spring 91$^f$, which permits relative movement between the sleeves 91$^a$ and 91$^c$ in the event that, when the clutch members are thrown into engagement, the teeth on the flange 91$^b$ should not exactly engage the spaces between the teeth on the gear wheel 88. If the ends of the teeth should happen to meet, the spring 91$^f$ will take up the resulting shock, and will also serve to positively snap the clutch teeth into place as soon as the shaft 90 has rotated sufficiently to allow the opposing teeth to mesh. The clutch 108 is of the same construction as the clutch 91 which has just been described.

The loose gear wheels 88 and 107 are prevented from sliding on their respective shafts by means of a plate 107$^a$, of generally diamond shape, shown in Fig. 20, the curved ends of which engage the edges of these loose gear wheels from the left, in Fig. 6. The plate 107$^a$ is rigidly secured to the frame of the machine in any suitable manner.

The gear wheel 107 meshes with a spur gear wheel 109 that is secured to a horizontal screw shaft 110 which extends through the wall of a clutch box 111, bolted to the frame or casing 14, and carries, at its outer end, a spur gear wheel 112 (see Figs. 6 and 20). At the point where the screw shaft 110 passes through the wall of the gear box 111, I provide a ball bearing thrust device 110$^a$ which prevents axial movement of the screw shaft. The gear wheel 112 meshes with a gear wheel 113 secured to a sleeve 114$^a$ that is rotatably mounted on a short shaft 114, adjustably secured in a slot 115 formed in a pivoted bracket 116, which may be angularly adjusted around the axis of the shaft 110. A gear wheel 117 is also mounted upon the sleeve 114$^a$, and meshes with a gear wheel 118 that is secured to a short horizontal shaft 119, to which is also secured a gear wheel 120 meshing with a gear wheel 121 that is keyed to the outer end of the shaft 90. The bracket 116, when properly adjusted about its pivot, may be clamped in position by means of bolts 116$^a$ that engage in T-slots in a bushing 116$^b$ that is secured to the clutch box 111 as shown in Fig. 6. The shaft 119 is disposed at the same level as shaft 106, but these shafts are not coaxial. It will be apparent that the shaft 90, and consequently the feed screw 46, are alternately driven in opposite directions, depending upon which of the clutches 91 and 108 is operated at a given time by the shifting lever 92.

My machine is adapted to cut arcuate teeth with reference either to the pitch circle or to the base circle of involute gears, and I select the relative diameters of the gear wheels 120 and 121 according to which of these two modes of operation is adapted in a particular case. Having made such selection the adjustability of the shaft 114 in the slot 115, together with the angular adjustability of the bracket 116, enable the diameters of the change-gears 112, 113, 117 and 118 to be varied accordingly, in order that the speed at which the tool saddle 10 is reciprocated may agree with the speed of the pitch circumference of the gear blank, or with the speed of the base circle of the gear blank, as the case may be.

As stated above, the shaft 100, driven by the motor 23, also furnishes power for rotating the horizontal shaft 45, Figs. 8 and 9, first a definite number of revolutions in one direction and then the same number of revolutions in the opposite direction, whereby the cutting tool is moved along its axis toward the gear blank and then, after a working period, is withdrawn from engagement with the blank. Referring to Fig. 21, the shaft 100 carries a pinion 124 that meshes with a gear wheel 125 secured to one member of a friction clutch 126, which is adapted to drive a shaft 127. The friction clutch 126 may be of any suitable construction, and, as shown on the drawings, it is similar in all respects to the friction clutch shown and hereinafter described in detail in connection with my novel indexing mechanism. Mounted loosely upon the shaft 127 are two miter gear wheels 128 and 129 (see Figs. 6 and 17), both of which mesh with a miter gear wheel 130, keyed to a horizontal shaft 131. The shaft 131 extends toward the rear of the machine, passes through the rear wall of the casing 14ª and carries at its outer end a spur gear wheel 132.

The miter gear wheels 128 and 129 are adapted to be alternately secured to the shaft 127 by means of a clutch 133, the construction and mode of operation of which will be described hereafter.

The gear wheel 132 meshes with a similar gear wheel 134 secured to one end of a horizontal shaft 135 that is parallel to the shaft 131 and in the same horizontal plane. To the inner end of the shaft 135 is secured a miter gear wheel 136 that meshes with a miter gear wheel 137 secured to the lower end of a tubular shaft 138 which surrounds the vertical shaft 38 and which is inclosed within the tubular shaft 95 (see Figs. 6 and 7).

As shown in Fig. 7, a spur gear wheel 139 is mounted upon the upper end of the tubular shaft 138 and meshes with a pinion 140 that is secured to a short vertical shaft 141, which carries at its upper end a miter gear wheel 142 meshing with a miter gear wheel 143 secured to the horizontal shaft 45. It will be readily understood that the shaft 45 will be rotated in one direction when the miter gear wheel 128 rotates with the shaft 127, and in the opposite direction when the miter gear wheel 129 rotates with the shaft 127.

The clutch 133, Fig. 17, by means of which the miter gear wheels 128 and 129 are alternately secured to the shaft 127 is provided with a series of teeth at 133ª, on its face that is adjacent to the miter gear wheel 128, and with a similar series of teeth at 133ᵇ, on its face that is adjacent to the miter gear wheel 129. These teeth mesh with corresponding series of teeth 128ª and 129ª that are formed integral with the miter gear wheels 128 and 129, respectively, and the proportions of the clutch and its teeth are such that the teeth on one side of the clutch are not entirely free from engagement with the clutch teeth on the adjacent miter gear wheel until just as the teeth on the other side of the clutch are brought in engagement with the corresponding clutch teeth on the other miter gear wheel. For example, when the clutch moves from the miter 128 toward the miter 129, the teeth 133ª remain in engagement with the teeth 128ª until immediately before the teeth 133ᵇ are in engagement with the teeth 129ª.

The arrangement just described insures accurate and positive engagement between the clutch teeth and the respective miter gear wheels, thus preventing slippage which would upset the proper timing of the two rotations of shaft 45 and giving corresponding accuracy in the forward and reverse movements of the cutting tool. The locking and timing mechanism, described hereafter, maintains the shaft 127 at rest when the clutch 133 is shifted.

The clutch 133 is operated by means of a lever 144 that is horizontally pivoted upon pins 145 and 147, as shown in Fig. 18. The mechanism for effecting and controlling the rotation of the shaft 131 in response to the movements of the clutch-shifting lever 144 will now be described.

Referring to Figs. 18 and 19, the lever 144 terminates, below its pivot-pin 145, in a curved arm 146 that is keyed to one end of the pivot pin 147, which is supported horizontally in the frame of the machine directly beneath the shaft 131, and which carries at its opposite end a T-shaped lever 1⅌

148. Mounted on the shaft 131 is a pair of locking disks 149 and 150, the disk 150 being keyed to the shaft 131 and prevented from longitudinal movement thereon by means of a set screw 151. The disk 149 is loose on the shaft 131 and is secured, by means of screws 152, to a toothed cam disk 153 that is also loosely mounted on the shaft 131. The cam disk 153 is driven at reduced speed from the shaft 131 through a pinion 154 which is keyed to the shaft 131 and which meshes with a spur gear wheel 155 that is secured to a sleeve 156. The sleeve 156 is loosely mounted on a horizontal pin 157 and carries also a small pinion 158 meshing with the teeth of the toothed cam disk 153. The proportions of the gear wheels that compose this reduction gearing are such that the cam disk 153, and consequently the locking disk 149, make one complete revolution while the shaft 131 and the locking disk 150 are making 15 revolutions. The exact gear ratio given is not essential to the mechanism, though it should be an odd ratio.

The locking disk 149 is provided with a groove 159 and the locking disk 150 is provided with a groove 160. These grooves extend across the faces of their respective locking disks, and, as shown in dotted lines in Fig. 18, are adapted to register and form a single continuous groove. It will be understood that, on account of the relative speeds of rotation of the locking disks 149 and 150, the grooves 159 and 160, if in registry when the disks begin to rotate, will again register when the disk 149 has made a half revolution, and the disk 150 has made 7½ revolutions. Registration of grooves occurs, of course, at other places, but this particular one suits my purpose best.

Pivoted on pins 161 and 162 that are supported in stationary brackets 163 and 164, adjacent to the locking disks 149 and 150, are two L-shaped hooks or latches 165 and 166, of the form shown in Fig. 19. The lower ends of these latches are of the curved form shown in this figure, and are adapted to be engaged by pins 167, one of which is secured to each of the outwardly-extending arms of the T-shaped lever 148 and extends perpendicularly therefrom. The upper ends of the latches 165 and 166 are bent into hooks 168 and 168ª which are of proper size and shape to enter the groove formed by the registering grooves 159 and 160 in the locking disks 149 and 150, as shown in Fig. 17. The latches are given a tendency to rotate about their respective pivots into engagement with the locking disks 149 and 150 by means of spring-pressed pins 169 and 170, shown in Fig. 19, which bear upwardly against the lower ends of the latches 165 and 166, respectively.

The T-shaped lever 148 is shown in its mid-position in Fig. 19, in which position the pins 167 are not in engagement with either of the latches 165 and 166. The lower end 171 of the T-shaped lever is of the pointed shape shown in Fig. 19, and this pointed end is engaged by a roller 172 secured to the end of a lever 173 that is pivoted at 174 to a downwardly-extending arm 175 of the bracket 164. This lever is normally forced upward by a spring-pressed pin 176, and, when the T-shaped lever 148 begins to rotate about its pivot-pin 147 in either direction, the roller 172 will bear against one or the other of the inclined sides of the pointed end 171 of the lever 148 and, after the point of the arm 171 has passed over it, will then tend to continue the rotative movement of the lever and to maintain the lever in its rotated position. When such rotation of the T-shaped lever 148 occurs, one or the other of the pins 167 will engage the lower hooked end of the latch 165 or of the latch 166 and will withdraw the upper hooked end of the latch from the registering grooves 159 and 160 in the locking disks 149 and 150. When the end 168ª of the latch 166 is received in the registering grooves in the locking disks, such grooves being, at that time, at the right of the disk, if the T-shaped lever 148 is caused to rotate in a clockwise direction, as seen in Fig. 19, by means of the shifting lever 144 shown in Fig. 18, then the end 168ª will be withdrawn from the registering grooves and the disks, and consequently the shaft 131, will be free to rotate. They will be driven in a counter-clockwise direction, as shown in Fig. 19, by power derived from the power shaft 100 through the friction clutch 126, and will continue to rotate until the disk 150 has completed 7½ revolutions, and the disk 149 has completed a half revolution, at which time the grooves 159 and 160 will again be in registry but at the left of the shaft 131, as seen in Fig. 19. At this point, the hook 168 of the latch 165, under the influence of the spring-pressed pin 169, will enter the combined grooves 159 and 160 and will hold the shaft 131 against rotation until the T-shaped lever 148 is rotated in a counter-clockwise direction about its pivot and disengages the latch 165 from the registering grooves 159 and 160. Such disengagement takes place when the clutch 133, Fig. 17, is so actuated by the lever 144 that the shaft 131 is caused to rotate in the opposite or clockwise direction, and therefore, when the latch 165 is withdrawn from the registering grooves, the locking disks will rotate in a clockwise direction until the disk 150 has completed 7½ revolutions and the disk 149 has completed a half revolution, when the end 168 of the latch 166 will again enter the registering grooves, thus completing the cycle of operations. It will be understood from the foregoing description, and from the drawings, that the shaft 131, and consequently the horizontal power shaft 45 at the top of the machine, are caused to rotate a definite number of times in one direction, then to stop until the clutch shifting lever is operated, and then to rotate the same number of times in the opposite direction. While the latches 165 and 166 are received in the slots in the locking disks, the engaging parts of the friction clutch 126 slip with respect to each other, and, as soon as the locking disks are released, power will be transmitted through the friction clutch 126 to the shafts 127 and 131 in the manner described above.

The locking and timing mechanism just described also controls the reversal in rotation of the feed screw 46 and of the table 3. The clutch-shifting lever 92, which actuates the clutches 91 and 108, is periodically oscillated by a link 177, shown on Figs. 6 and 19, which is pivoted at one end to the lower end of the clutch-shifting lever 92 and at the other end is pivoted to a lever 178 that is secured to a horizontal rocking shaft 179. The rocking shaft 179 also carries a downwardly-extending lever 179ᵃ which, at its lower end, is provided with a roller 180 that travels in a cam groove 181 in the face of the cam disk 153, as shown on Figs. 17 and 19. The cam groove 181 is of such shape that, when the parts are in the position in which both of the latches 165 and 166 are free from the grooves in the locking disks and the cam disk 153 is consequently in rotation, the roller 180 travels in the circular portion of the cam groove that is concentric with the shaft 131. The levers 178 and 92, and consequently the clutches 91 and 108, are thereby maintained in their middle or neutral position, and the feed screw 46, the tool saddle 10 and the table 3 are stationary. When the cam disk is caused to rotate in a clockwise direction, as seen in Fig. 19 and the roller 180 reaches the end 182 of the cam groove, the roller is forced away from the center of the cam disk, and the levers 179ᵃ and 178 are consequently rotated in a counter-clockwise direction about the rock shaft 179. The clutch-shifting lever 92 is thereby rotated in the opposite direction about its pivot, thus throwing in the clutch 91 and causing the feed screw 46 to rotate in the proper direction to move the tool-saddle in its positive or working stroke. When the cam disk begins to rotate in the opposite direction, under the influence of the locking and timing mechanism described above, the roller 180 will at once be withdrawn from the end 182 of the cam groove 181 and caused to approach the center of the cam disk and travel in the concentric portion of the groove, whereupon the clutch-shifting lever 92 and the clutches 91 and 108 will be returned to their neutral positions. When the roller 180 reaches the opposite end 183 of the cam groove, as shown in Fig. 19, it will be drawn still nearer to the center of the disk, and the lever 178 will consequently be rotated in a clockwise direction, thus causing the shifting-lever 92 to throw in the clutch 108 and thereby setting the feed screw 46 in motion in its reverse direction, to return the tool saddle to its starting position.

Proceeding to a description of the tool 8 and the carriage or tool-saddle 10, which, as stated above, are caused to reciprocate bodily along the rail 11 by means of the feed screw 46, attention is especially called to Figs. 2, 3 and 4, wherein these parts are best shown. The rail 11 is of the cross-sectional form shown in Fig. 2, and is provided with upper and lower straight flanges 184 and 185 which are embraced by gibs 186 and 187 secured respectively to the upper and lower portions of the tool saddle 10. The tool saddle 10 is also provided with a horizontal bearing surface 189 that rests upon a corresponding horizontal support 190, formed in the rail 11, as shown in Figs. 2 and 3. The bearing surface 189 is provided with two tapered gibs, one of which is shown in Fig. 2, the gibs being adjustable and held in position by means of screws, one of which 192, is shown in Fig. 3, at the end of the tool saddle.

Slidable in vertical slots or ways in the tool saddle is a vertically movable knee casting 195, which serves as a support for the tool spindle 9 and for its operating mechanism. The vertical slots or ways are of the cross-sectional form shown at 196 in Fig. 24. The knee casting 195 is suspended from an internally threaded projection 197 at the top of the part 188 of the tool saddle 10 by means of a vertical screw 198, the lower end of which is rotatably secured in a bearing bracket 199 in the knee casting 195, and the upper end of which passes through the projection 197 as shown in Figs. 2 and 4. The knee casting 195, and consequently the cutting tool 8, are adapted to be vertically adjusted by turning the screw 198. The knee casting 195 is secured in its vertically adjusted position by means of a series of bolts 200 which extend through a gib 193ᵃ into the threaded holes in the tool saddle 10 and press the gib against the knee casting 195. As shown in Figs. 2, 4 and 23, the screw 198 is secured at its lower end in the bracket 199 against vertical movement relative to the knee casting 195. Below this bracket, the screw is provided with a worm wheel 201 that meshes with a worm 202 on a horizontal shaft 203, one end of which is supported in an outwardly-extending arm 204 of the bracket 199 and the other end of which is supported in a bearing 205 in the knee casting 195. The latter end of the shaft 203 is provided with a hand wheel 206. It will be apparent that the vertical adjustment of the knee casting 195 may be readily effected by turning the hand wheel 206 and that, when the desired position is attained, the knee casting may be secured in its adjusted position by means of the bolts 200.

In addition to the vertical adjustment of the tool spindle, means are also provided for adjusting the entire tool saddle 10 along the rail 11 lengthwise of the feed screw 46. The tool saddle is provided with an elongated nut 207, shown in Figs. 2 and 24, with which the feed screw 46 is in engagement. The saddle-nut 207 comprises a sleeve 208 provided at one end with a flange 209 and externally threaded at the other end to receive a split nut 210. The interior of the sleeve 208 is screw-threaded for a considerable distance from each of its ends and into one end is screwed a flanged bushing 211, while into the other end is screwed a flanged nut 212, the interior of which is provided with threads 213 of proper size to mesh with the threads on the feed screw 46. The nut 212 may suitably be of bronze. A second nut 214 is confined between the ends of the nut 212 and the bushing 211. Both of the nuts 212 and 214 are prevented from rotating with respect to the sleeve 208 by means of keys which are disposed in coöperating keyways 216 in the sleeve 208 and in the nuts 212 and 214, as indicated in dotted lines in Fig. 24. A jam-nut 217 is interposed between the end flange 209 of the sleeve 208 and the end-flange of the bushing 211. A similar jam-nut 218 is interposed between the opposite end of the sleeve 208 and the end-flange of the nut 212. These jam-nuts serve to maintain the nuts 212 and 214 and the bushing 211 in their assembled position within the sleeve 208.

The structure of the saddle-nut just described, prevents the threads of the nut and of the feed screw 46 from being subjected to differential strains, which might distort their pitch to an appreciable extent. When the feed screw 46 is rotated in the proper direction to move the tool saddle 10 to the left, as seen in Fig. 24, the threads 213 in the nut 212 serve to bear the stress load between the tool-saddle and the feed screw. Since this load is transmitted from the tool saddle to the screw through the flange 209, the threads 213 in the nut 212 and the threads in the feed screw 46 are under tensioning strains only, and therefore there is less danger of wear and distortion of the threads than if the threads in the nut were under compression while the threads on the screw are under tension. The space between the nuts 212 and 214 is such that, during the movement stated, the left sides of the threads on the screw shaft do not touch the corresponding sides of the teeth in the nut 214. The nut 214 is therefore inoperative during this movement, as far as the transmission of power is concerned. When, however, the direction of rotation of the feed screw is reversed, and the tool saddle is caused to move to the right, as seen in Fig. 24, the relations of the nuts 212 and 214 to the feed screw 46 are reversed. The nut 214 now bears the load, and, since this load is transmitted through the sleeve 207, the threads on both the feed screw and the nut 214 are under compression only. During this movement, the nut 212 transmits power, for the reasons stated above in connection with the function of the nut 214 during the first-described movement of the tool-saddle. The space between the nuts 212 and 214 may be adjusted by properly turning the nut 212 and the jam-nut 218. Another important advantage of the nut structure just described is that back-lash is prevented between the screw and the nut. This result is accomplished by so adjusting the space between the nuts 212 and 214 that the threads in the nut 212 press against the screw threads to their right, as shown in Fig. 24, while the threads in the nut 214 press against the threads to their left. This arrangement effectively prevents lost motion between the screw and the nuts when the screw is stopped and reversed.

Keyed to the sleeve 208, adjacent to the split nut 210, is a worm wheel 219 that meshes with a worm 220 secured to the upper end of a vertical shaft 221, which is supported in bearings 222 and 223 on the tool-saddle as shown in Fig. 25. The worm 220 is inclosed in a housing 224. The lower end of the shaft 221 is provided with a hand-wheel 225 by means of which the worm 220 and the worm wheel 219 may be turned, thus rotating the saddle nut upon the feed screw 46 and causing the tool saddle to move bodily along the feed screw.

Referring now to Fig. 2 of the drawings, the cutting tool 8 is an end-milling tool of the form shown, preferably composed of a number of separate and removable cutting teeth 226, arranged in a circle upon the periphery of the tool 8, which is removably secured, as by means of a key 227 and a nut 228, to the left end of the spindle 9. The spindle 9 rotates in bearings 229ᵃ and 229ᵇ, disposed in a cylindrical bearing sleeve 229, bearing-balls 230 being disposed in suitable ball races near the ends of the spindle for taking up end thrust. The cylindrical bearing-sleeve 229 is externally screw-threaded over an intermediate portion of its length and is adapted to reciprocate bodily in stationary bearings 231 and 231ᵃ which form a part of the knee casting 195 that is secured to the tool saddle 10. Surrounding the cylindrical bearing-sleeve 229, and engaging the threads thereon, is an internally threaded worm wheel or ring 232. Associated with the worm ring 232 is a ring 233 that is externally threaded to engage threads on a portion of the worm ring 232 that is of enlarged internal diameter. The ring 233 is internally threaded to engage the threads on the bearing-sleeve 229 adjacent to the worm ring 232 and forms, in effect, a continuous nut with the worm ring 232. A jam-nut 234 is threaded upon the ring 233 and prevents disengagement between the worm ring 232 and the ring 233. The arrangement just explained affords means for taking up end-play between the worm ring 232 and the bearing sleeve 229. The worm ring 232 meshes with a worm 235 which, as shown in Fig. 30, is secured to the end of an inclined shaft 236 that is mounted in bearings 237 and 238 in an extension 256 of a sleeve 239 that surrounds the circular bearing-sleeve 229 outside, and to the right in Fig. 2, of the worm ring 232. The outer end of the shaft 236 is provided with a hand wheel 236ª. When the hand wheel 236ª is turned, the worm 235 rotates the worm ring 232 and thereby advances or withdraws the spindle bearing-sleeve 229 and consequently the cutting tool 8.

In addition to the manual axial adjustment just described, the tool-spindle is also provided with automatic means for moving it toward and from the gear blank before and after the cutting of each tooth, this automatic reciprocation being effected, as stated above, by power taken from the horizontal shaft 45 at the top of the machine. As shown in Fig. 2, such automatic means comprises the sleeve 239, which is externally screw-threaded to receive an internally threaded worm ring 241 that meshes with a worm 242 which, as shown on Fig. 29, is secured to a horizontal shaft 243 that is mounted in bearings 244 and 245 in the knee casting 195.

Power for rotating the shaft 243, first in one direction and then in the other, is derived from the horizontal shaft 45 through the following mechanism. As shown in Figs. 3, 29, 31, 32 and 33, the tool saddle 10 is provided with a bracket 246 that extends upward and outward near the shafts 44 and 45, and is provided with a bearing 247, surrounding the shaft 44, and with a bearing 248 surrounding the shaft 45. Mounted for rotation in the bearing 248, and slidably keyed to the shaft 45, as shown in Fig. 33, is a screw gear wheel 249 that meshes with a similar screw gear wheel 250 secured to the upper end of a vertical shaft 251 that is rotatably mounted in bearings, one of which is shown at 252 as an extension of the bracket 246. The other bearing, shown at 253 in Fig. 29, is slidable with respect to the shaft 251 and supports also a miter gear wheel 254 that is slidably keyed to the shaft 251. The miter gear wheel 254 meshes with a similar miter gear wheel 255 that is secured to one end of the horizontal shaft 243. It will be evident that the above-described intermittent rotation of the shaft 45 in opposite directions is communicated, through the gearing just described, to the worm ring 241, and that this oscillation of the worm ring 241 serves to reciprocate the tool spindle and the tool toward and from the gear blank. The slidable relation of the miter gear wheel 254 with respect to the shaft 251, and of the screw gear wheel 249 with respect to the shaft 45, allows for the vertical adjustment of the tool spindle and its operating mechanism, and also for the lengthwise movement of the tool saddle 10 that is produced in the manner heretofore described by the feed screw 46. Fig. 28 shows the relation between the manual and automatic means for advancing and withdrawing the tool spindle, and also shows a housing 256 that surrounds the manually operated adjusting mechanism, and a housing 257 that surrounds the automatically actuated reciprocating mechanism.

Power for constantly rotating the cutting tool is derived from the horizontal shaft 44. As stated above, the tool-saddle bracket 246 is provided with a bearing 247 surrounding the shaft 44. Mounted for rotation in the bearing 247, as shown in Fig. 32, is a miter gear wheel 258 slidably keyed to the shaft 44 and meshing with a corresponding miter gear wheel 259 that is secured to the upper end of a vertical shaft 260. Secured to the tool saddle frame 195, as shown in Figs. 3, 7, 26 and 27, is a housing 261 that incloses meshing miter gear wheels 262 and 263, shown in Figs. 3 and 26. The miter gear wheel 262 is slidably keyed to the vertical shaft 260, and therefore slides along this shaft when the cutting tool is vertically adjusted. The miter gear wheel 263 is slidably keyed to a shaft 264, and is mounted, as shown in Figs. 3 and 37, in a bearing 265 that is rigidly attached to the knee casting 195. The shaft 264 reciprocates longitudinally with the tool spindle, passes through a yoke 266 carried by a bracket 267, and is mounted at its right end in bearings 277ª in a housing bracket 268. The yoke 266 coöperates with an annular groove in a collar 266ᶜ that is fastened to the shaft 264 by set screws 266ᵇ, or other suitable means. The bracket 267, on which the yoke 266 is mounted, is secured to the sleeve 239 which reciprocates with the tool spindle support 229 (see Fig. 2). Thus the reciprocating motion of the tool spindle is accompanied by a like movement of the shaft 264. Near the rear end of the shaft 264 an elongated herringbone pinion 269 is slidably keyed. This pinion 269 meshes with a large herringbone gear wheel 270, which is secured to the rear end of the tool spindle 9, as shown in Figs. 2, 3 and 5. The pinion 269 has a slight axial freedom upon the shaft 264, and therefore any back lash between the gear wheel 270 and the pinion 269 is taken up by a very slight sliding movement of the pinion 269. This arrangement avoids noise during the operation of the machine.

In order to avoid variation in the depth of the gear teeth cut with this machine, it is necessary to keep the tool spindle at as near as practicable the same axial position during the cutting of all the teeth. Any end play between the spindle and the parts that give it its axial adjustment and automatic axial movement must be avoided as far as practicable. To accomplish this, I provide elastic buffers between the frame 195 and the worm wheel ring 232. As shown in Figs. 26, 27 and 28, each of these buffers comprises a pin 240 that is slidably disposed in an opening 240$^a$ in the knee casting 195, and is yieldingly forced outward by a helical compression spring 240$^b$. A vertical pin 240$^c$ extends into a slot 240$^d$ in the pin 240, and prevents its removal from the opening 240$^a$. The spring 240$^b$ is of such strength that, when the ring 232, in its movement with the tool spindle 9, engages the end of the pins 240, the resistance exerted by the buffer sets back upon each other the following parts, removing the end play between them: the worm wheel ring 232, the sleeve 239, the worm driven nut 241 and the rear spindle support bearing 231$^a$ of the frame 195.

The adjustable split nut, consisting of parts 232, 233 and 234, is provided in order to take up lost motion between the ring 232 and the spindle support 229, and as a further means of taking up axial end play between the parts of the cutter support, I provide a split nut 270$^a$, which is disposed on the threaded portion of the spindle 9 between the gear wheel 270 and the spindle support bearing 231$^a$.

As stated above, the rail 11 is pivoted at one end at 12, see Figs. 8 and 9, the other end being mounted on the housing 16 that is slidable on the curved track 17. The manner in which the rail is pivotally supported and adjusted will now be described.

Referring to Figs. 4, 5, 6, 8 and 9, the gear box 13, at the left of the machine as seen in Fig. 4, is provided with a cover 271, shown in Fig. 6, upon which rests one end of the rail 11. The rail 11, at this point, is provided with a pivot-bushing 12 that is received in an opening 272 in the cover 271 of the gear box 13 and serves as a pivot for the rail. The cover 271 may conveniently be provided with one or more curved inverted T-shaped slots 273 adapted to receive and guide the heads of bolts that are secured to the rail 11 in the manner common to machine tools by means of nuts 273$^a$, as shown in Figs. 4 and 5.

The outer swinging end 15 of the rail 11 serves to support outer end-bearings 297 and 275 for the horizontal power shafts 44 and 45, respectively, and also carries the rail-adjusting mechanism. Power for rotating the rail 11 about its pivot 12 is taken from the horizontal shaft 44, through a pinion 276, which is slidably keyed to the shaft 44 and which meshes with a spur gear wheel 277, shown in Figs. 4, 5, 9 and 15. The gear wheel 277 is secured to a short horizontal shaft 278 which is supported in bearings 279 and 280. Loosely mounted on the shaft 278 are miter gear wheels 281 and 282, both of which mesh with a miter gear wheel 283 that is secured to one end of a short horizontal shaft 284 disposed at right angles to the short shaft 278. The shaft 284 is provided with a worm pinion 285 meshing with a worm wheel 286 that is secured to the upper end of a vertical shaft 287 that extends downward to a point adjacent to the track 17, where it is mounted in a bearing 288, below which it is provided with a spur pinion 289 meshing with a segmental rack 290 that is bolted to the upper and outer edge of the track 17.

Between the miter gear wheels 281 and 282, on the shaft 278, is a clutch 291 that is provided with a handle 292 pivoted at 293, by means of which either of the miter gear wheels 281 and 282 may be secured to the shaft 278 for rotation therewith. It will be evident from the foregoing description that the rail 11 may be caused to swing in either direction along the track 17 by so operating the handle 292 that the proper miter gear wheel is caused to rotate with the shaft 278. When the rail 11 reaches its proper point of angular adjustment, it may be brought to rest by sliding the clutch 291 to its middle or neutral position and locking it there by means of a spring-pressed pin 293$^a$. The adjusting mechanism just described may be disconnected by means of a rod 294 that slides in bearings 295 and 296 in a bracket 274, to which is secured the bearing 297 of the shaft 44. The rod 294 is provided at one end with a knob 298 and at the other end it is secured to a shifting fork 299 that is adapted to enter an annular groove 300 formed in a lateral extension of the pinion 276, which, as stated above, is slidably keyed to the shaft 44. By shifting the pinion 276 along the shaft 44 until it no longer meshes with the gear wheel 277, the rail 11 is prevented from accidental displacement during the operation of the machine and the mechanism for adjusting the rail is brought to rest, thus avoiding unnecessary noise and wear. The rail is further secured in its adjusted position by tightening nuts 301 that are screwed to the inverted bolts which slide with the housing 16 upon the track 17.

The oscillation of the blank-supporting table 3 during the cutting of each tooth is effected by the coöperation of the segmental rack 19 and the reciprocating straight rack 20, as indicated above. As shown in Figs. 1, 2 and 10, the straight rack 20 is formed on one side of an elongated rectangular box 302 that is disposed in a horizontal trough 303 adjacent to the rear edge of the table 3. The closeness with which the box 302 engages the segmental rack 19 may be regulated by wedges 304 and 305, shown in Figs. 1 and 2, the wedge 304 being secured to the inner side of the trough 303, while the wedge 305 is slidable with respect to the wedge 304. Thus, by moving the wedge 305, the rack box 302 may be pressed more or less tightly against the segmental rack 19. The rack box is retained in the trough 303 by means of plates 306 which are secured to the upper edges of the trough by means of screw bolts 307 and which are provided at their inwardly-extending edges with downturned flanges that coöperate with corresponding flanges 308 on the upper edges of the rack box 302.

The reciprocation of the rack box 302 is effected by means of a screw 310 that coöperates with threads in a nut 311, indicated at the left of Fig. 1, which is similar in construction to the saddle nut shown in Fig. 24, and which is bolted to the left end of the rack box 302. A bracket 312 is secured to the trough 303 and supports a bearing 313 for one end of the screw 310. The other end of the screw is axially coupled to the shaft 110, as shown in Fig. 6, and the screw consequently rotates in unison with the shaft 110.

The shaft 110 is rotated, when the clutch 108 is in engagement with the gear wheel 107, by power derived from the auxiliary power shaft 100 through the inclined shaft 103, gear wheels 104 and 105, shaft 106 and gear wheels 107 and 109. When the clutch 108 is so operated as to disconnect the gear wheel 107 from the shaft 106 and the clutch 91 is so actuated as to connect the gear wheel 88 with the shaft 87, the shaft 110, and consequently the screw 310, are driven in the opposite direction by power derived from the shaft 87 through the gear wheels 88 and 89, shaft 90, gear wheels 121 and 120, shaft 119, gear wheels 118 and 117, shaft 114 and gear wheels 113 and 112. It will thus be seen that the oscillation of the table is effected in unison with the reverse rotation of the feed screw 46 which causes the reciprocation of the tool saddle 10.

When the cutting of each tooth is completed, the table is returned, by means of the rack mechanism just described, to the position which it occupied at the beginning of the cutting stroke, and during this return movement of the table, the gear blank is rotated, with respect to the table sufficiently to bring the blank into position for the cutting of the next successive tooth. This rotation of the gear blank is effected by my novel indexing mechanism.

In order that the table 3 may be given a step-by-step indexing rotation, and may also be capable of the above-described oscillation during the cutting of each tooth, the table is constructed in two associated concentric parts that are adapted to be moved together as a unit during the cutting of each tooth, while only the portion that supports the gear blank is given the periodic indexing movement. As shown in Fig. 2, the table 3 carries beneath its outer edge a depending circular frame 314 which is secured to the table 3 by means of a series of tap bolts 315, two of which are shown in Fig. 2. The frame 314 is provided with an offset portion 317 that forms a seat for an annular channeled ring 318, which completely surrounds the table 3 and which is fitted closely in the seats formed by the frame 314 and the offset portion 317, but in such a manner that relative rotary movement is permitted between the frame 314 and the channeled ring 318. The teeth of the rack 19, Fig. 1, are formed on the portion of the ring 318 adjacent to the reciprocating rack 20, while the indexing mechanism 21 is supported on the ring 318 at a point substantially one-third of the distance in a clockwise direction around the table 3, as seen in Fig. 1. At this point, the ring 318 is provided with a depending bracket 319 and with an outwardly and downwardly extending bracket 320. These brackets support bearings for the various shafts of the indexing mechanism. The offset portion 317 of the depending frame 314 is provided with worm teeth 321 which are engaged by a worm pinion 322, Fig. 1, that is actuated in a manner to be described hereafter. The pinion 322 performs the double function of imparting indexing rotation to the table 3 and of locking together the table 3 and the ring 318 during the cutting of each tooth. The mechanism for actuating the worm pinion 322 will now be described, reference being had to Figs. 1, 2, 21, 22 and 38 to 43, inclusive.

Referring particularly to Fig. 21, the auxiliary power shaft 100, driven by the small motor 23, carries rigidly a clutch member 323 and also carries loosely a worm pinion 324 that is provided with an extension 325 having an annular groove 326, into which extends a curved shoe 327 secured to a hand lever 328 that is eccentrically pivoted at 329 in the machine frame. By means of this lever, the worm pinion 324 may be connected to rotate with the shaft 100.

Referring now to Fig. 2, the worm pinion 130

324 meshes with a worm wheel 330 that is secured to a short horizontal shaft 331, which is mounted in bearings 332 and 333 in the frame of the machine and which also carries a bevel pinion 334 that meshes with a bevel gear ring 335 which is adapted to move in a circular slot 336 formed in the frame of the machine. The gear ring 335 also meshes with a bevel pinion 337 that is secured to a short horizontal shaft 338 mounted in bearings formed in the brackets 319 and 320 that are attached, as stated above, to the annular channel casting 318. The gear ring 335 is driven from the shaft 100 through the manually-operated clutch pinion 324 in making initial adjustments of the machine. Thereafter, during the automatic operation, the gear ring is maintained stationary by the locking device associated with worm pinion 324 as described above, and the indexing power is derived from the rolling engagement between the gear ring and the pinion 337, while the table is being returned to its starting position.

As best shown in Fig. 38, the shaft 338 carries a friction clutch, which may be of any suitable construction, and which, as shown, comprises a driving disk 341 formed integral with a collar 342 that is keyed to the shaft 338, and a toothed driven disk 343 loosely mounted on the shaft 338 and connected to the driving disk 341 by means of intermediate friction pads 344 and 345 that are secured to disks 346 and 347 pressed against opposite sides of the driving disk 341 by means of concave disk-springs 348 and 349. The frictionally-engaging clutch members are inclosed, on the side opposite the toothed disk 343, by a disk 350, which is secured to the toothed disk 343 by screws at the rim. The disk 350 carries a threaded sleeve 351, which is loosely mounted on the shaft 338. The friction clutch as a whole is maintained in position on the shaft 338 by means of a collar 352 that is secured to the shaft 338 by means of a set screw 353. A jam-nut 354 maintains the sleeve 351 in position in the disk 350. It is evident that the pressure exerted upon the pads by the concave springs 348 and 349 may be regulated by turning sleeve 351 relative to disk 350.

The teeth formed on the periphery of the driven disk 343 mesh with a pinion 355 keyed to one end of a horizontal shaft 356 that carries, rigidly secured near its other end, a locking disk 357. Two concentric sleeves 358 and 359 are loosely carried by the shaft 356. Mounted on one end of the sleeve 358 is a second locking disk 360, adjacent to the locking disk 357, while the other end of this sleeve carries a gear wheel 361. The outer concentric sleeve 359 carries a third locking disk 362, adjacent to the locking disk 360, while to the other end is secured a gear wheel 363, of smaller diameter than the gear wheel 361 and adjacent thereto.

Horizontally adjacent to the shaft 356 is a shaft 364, to which are rigidly secured a pinion 365, a smaller pinion 366 and a somewhat larger pinion 367, the pinions 366 and 367 being integrally united. The pinion 365 is driven by the toothed disk 343 of the friction clutch. The pinion 366 meshes with the gear wheel 361 on the shaft 356 and the pinion 367 meshes with the gear wheel 363 on the shaft 356.

To the outer end of the shaft 364 is secured a spur gear wheel 369 that meshes with a spur gear wheel 370 secured to one end of a sleeve 371, which is rotatably supported by a pin 372 that is adjustably secured in a slot 373 in an inclined bracket 374. The gear wheel 370 may be of any desired diameter, according to the pitch of the gear that is to be cut, and the bracket 374 is pivotally adjustable around a horizontal shaft 375 by means of bolts 374$^a$ and slots 374$^b$, as shown in Fig. 40. To the other end of sleeve 371 is secured a spur gear wheel 376 that meshes with a spur gear wheel 377 secured to the shaft 375. Gear wheels 376 and 377 may also be of any desired diameters to conform to the proper spacing of the teeth to be cut on the gear blank.

Secured to the shaft 375, near its inner end, is a bevel pinion 378 meshing with a bevel pinion 379, which is secured, as shown in Fig. 1, to a horizontal shaft 380 mounted in bearings in a housing 381 that is pivotally movable about a pin 382. Secured to the horizontal shaft 380 is the worm pinion 322, which, as stated above, meshes with the worm teeth 321 in the annular frame 314, and thereby rotates the table when the friction clutch on the shaft 338 is permitted to operate. The pivotal support of the housing 381 permits the worm pinion 322 to be disconnected from the teeth 321 when it is desired to turn the table by hand in the initial setting of the machine.

The locking disks 357, 360 and 362, described above, are provided with slots 383, 384 and 385, respectively, which are shown in Figs. 38, 39 and 40. Secured to a horizontal rod 386, are a short, downwardly-extending lever 387 and a longer, upwardly-extending lever 388. These levers are secured to opposite ends of the rod 386, and together form, in effect, a bell crank lever, as best seen in Fig. 40. The downwardly-extending lever 387 is provided with a roller 389 adapted to be engaged by the inclined faces of a cam 390, which is horizontally reciprocated in a manner to be described hereafter. The lever 388 is provded with a laterally extending head 391 in which are formed a series of three holes, 392, 393 and 394. A pin 395 is adapted to be inserted and secured in either of the three holes just mentioned, and the relation of the parts is such that the holes 392 and 393 are directly opposite to the slots 384 and 385, respectively, in the locking disks, and that the head 395ª of the pin 395 is adapted to enter the slot opposite to the hole in which it is secured. When secured in hole 394, the pin 395 is inoperative. The lever 388 carries a projection 388ª that stands opposite locking disk 357 so as to engage slot 383 when required. A short helical spring 396 connects the lever 388 to a stationary housing 397 that surrounds the locking disks, and the lever 388, together with the projection 388ª and the head 395ª of the pin 395 is thereby normally drawn toward the locking disks.

The shaft 356, when free to rotate, is driven from the shaft 338 through the friction clutch and the gearing 343 and 355, but when the projection 388ª enters the slot 383 in the locking disk 357, the rotation of the shaft 356 is restrained, and the indexing mechanism is therefore prevented from operating until the projection is withdrawn from the slot. This is periodically accomplished by the engagement of the reciprocating cam 390 with the roller 389 on the lever 387, which causes the lever 388 to rotate with the shaft 386 and thereby to withdraw the projection 388ª from the slot in the locking disk. The shaft 356 then rotates until the members 388ª and 395ª register with the slots in the locking disks opposite which they are placed. Hence it is possible to give to shaft 356, one, two or four complete revolutions, as desired, according to the position of pin 395 in holes 394, 393 and 392, respectively. The differences in sizes of the gears 367, 366, 363 and 361 are so calculated that when disk 357 makes four revolutions, disk 362 will make two and disk 360 one. Hence when the slots and the members 388ª and 395ª register, the latter are drawn into the slots under the influence of the spring 396, thereby stopping the rotation of shaft 357, the cam 390 having meanwhile been separated from engagement with the roller 389 by the reverse rotation of the table 3, carrying the indexing mechanism. Since the indexing worm pinion 322 is driven from the shaft 356 through the train of gearing already described, it is evident that the amount of the indexing rotation of the table may be varied according to the disk with which the pin 395 coöperates and the sizes of the change gears in the train. It is also evident that the speed at which the table is indexed through a given arc may also be varied by selecting one of the three locking disks as the regulator, employing gear wheels 369, 370, 376 and 377 of corresponding size, and properly adjusting the bracket 374 and pin 372 which support the gear wheels 370 and 376. For example, if the locking disk 360 is selected as the regulator and a relatively small gear wheel 370 is employed, the blank will be indexed for teeth of a given pitch at a relatively slow rate, since four complete revolutions of the shaft 356 are necessary in order to effect one revolution of the locking disk 360 and hence the indexing. Teeth of the same pitch may be indexed twice or four times as rapidly by selecting the locking disk 362 or the locking disk 357 as the regulator, and employing a gear wheel 370 of twice or four times the circumference of the gear wheel employed in the first example. The slow indexing rotation of the table is desirable when large gear blanks are being cut, since less severe strains are set up when the indexing movement is started and stopped, but when small blanks are being operated upon, it is preferable to regulate the indexing mechanism by the locking disk 357 and thus rapidly set the blank for each successive tooth. Another advantage of the use of three locking disks is that it allows of the indexing of coarse pitches for small gear blanks during the limited reciprocating movement of the table.

In order to accomplish the automatic actuation of all the various mechanisms of the machine in their proper sequence and relation to each other, the machine is provided with a system of clutch-operating mechanism which may best be understood by reference to Figs. 2, 5 and 45 to 50, inclusive. Referring to Figs. 1 and 2, the top of the rack box 302 carries a plate or bracket 399 secured thereto by means of a pair of bolts 400. The bracket 399 is provided at its outer end with a fork 401 shown in Fig. 5, and this fork embraces a dog 402 which is of the hooked form shown in Fig. 2, the hook extending downward and partly surrounding a horizontal shifting rod 403 that is provided with adjustable collars 404 and 405 which may be positioned by means of set screws 406 and 407 at any point along the shifting rod 403. The shifting rod is slidably supported at its ends in brackets 398 and 408. In order that the operation of the machine may be reversed in the event that the adjustable collars 404 or 405 should slip, I provide safety collars 409 and 410, which are rigidly secured to the rod 403 and which are adapted to coöperate with the hooked dog 402 and, by reversing the machine, to prevent breakage. When the parts are in the position shown in Fig. 5, the rack box 302, carrying the dog 402, has nearly reached its extreme limit of movement to the right, and the dog 402 is in engagement with the collar 404. A slight further movement of the dog to the right moves the shifting rod longitudinally, and with it, a link 411 that is pivoted at 412 to the end of the shifting rod 403. The other end of the link 411 is pivoted to a curved lever 413, only the lower end of which is shown in Fig. 5, and which is shown in end elevation in Fig. 2 and in side elevation in Fig. 6. The link 411 may be either attached near the lower end of the lever 413 as shown on Fig. 6, or it may be attached to the upper end 414 of this lever, which is shown on Fig. 2. To the extreme lower end of the lever 413 is pivoted a link 415, shown on Figs. 5 and 6, the other end of which is pivoted to the clutch-shifting lever 144 by means of which the clutch 133 is operated.

It will be evident from the foregoing description that when the dog 402 carried by the rack-box 302 moves to its extreme position to the right in Fig. 5, the clutch lever 144 will be moved to the left in Fig. 6, if the link 411 is attached to the lower end of the lever 413, as shown on Fig. 6, while if the link 411 is attached to the upper end of the lever 413, the lever 144 will be moved to the right in Fig. 6. It will also be evident that when the dog 402 is moved to the left in Fig. 5, into engagement with the collar 405, the lever 144 will be moved in the reverse direction. The automatic actuation of the clutch-shifting lever 92 responsive to the movement of the clutch lever 144, has already been described.

In addition to the automatic actuation of the clutches 91 and 108 by the clutch lever 92, hand operated means are also provided, by means of which these clutches may be operated while the machine is at rest or in effecting initial adjustments when the machine is started. As shown on Figs. 2, 5, 47 and 48 of the drawings, such hand operated clutch-controlling means comprise a horizontally slidable rod 416 which is supported in a bracket 417 on the back of the machine frame and is provided at one end with a knob 418. The other end of the lever 416 is pivoted at 419 to the lower end of a lever 420 which is centrally pivoted at 421 and which is pivoted at its upper end to a link 422, best shown in Figs. 6, 47 and 48, the opposite end of which is pivotally connected to a curved lever 423 that is secured to the clutch-shifting lever 92. The relation between the hand and automatic clutch-shifting mechanisms may best be understood by reference to Fig. 44, in which the curved lever 423 is shown in elevation and adjacent to the lever 92, to which the automatic shifting rod 177 is pivotally connected, as stated above. The lever 423 is rigidly secured to a collar 424 that is loosely carried on a pivot pin 425, and by means of a curved arm 426, is also rigidly attached to a similar collar 427 also mounted on the pivot pin 425. A clutch-shifting ring 428 is secured between an arm 429 integral with the collar 424 and an arm 430 integral with the arm 426, and a similar clutch-shifting ring 431 is held between arms 432 and 433, both of which are integral with the collar 427. The clutch-shifting ring 428 operates the clutch 91 and the clutch shifting ring 431 operates the clutch 108, as shown in Fig. 6.

The automatic control lever 92 is formed integral with a U-shaped member 434, one arm 435 of which is secured to a collar 436 that is loosely mounted on the pivot pin 425 between the collars 424 and 427, while the other and longer arm 437 of the member 434 is secured to a collar 438 carried on the pivot pin 425 outside of the collar 424. The arm 437 is extended upwardly adjacent to an extension 439 of the arm 429. The arms 439 and 437 are adapted to be releasably secured together by means of a bolt 440 which is slidably held in a slot 441 in the arm 439 and which is adapted to enter a notch in the upper end of the arm 437. It will be observed that, when the bolt 440 is in the position shown in Fig. 44, the arms 437 and 439 are secured together so as to rock in unison about the pivot 425, but that, when the bolt 440 is released and moved upwardly in the slot 441, the two arms will be disconnected and the automatic clutch shifting mechanism will be inoperative.

The cam disk 153 which effects the automatic actuation of the clutches 91 and 108 is also adapted to control the operation of the indexing device 21, by means of the following mechanism. The cam disk 153, as shown in Fig. 19, is provided with lugs 442 and 442a disposed outside of and adjacent to the ends 182 and 183 respectively of the cam groove 181. Parallel to the cam shaft 131, to the right and somewhat below it, is a rocking shaft 443, shown on Figs. 6, 17 and 19. This rocking shaft carries a short lever 444 which is provided with a roller 445 and which is so positioned on the shaft 443 as to be in the path of movement of the lugs 442 and 442a as the cam disk rotates. When the cam disk is in the position shown in Fig. 19, in which the cam disk is rotating in the direction of the arrow 446a, and in which the roller 180 on the lever 179a is approaching the end 183 of the cam groove 181, the lug 442a will engage the roller 445 and cause the lever 444 to rotate the rocking shaft 443 in a clockwise direction. It will be recalled that, when the cam disk 153 is in the position shown in Fig. 19, the cutting tool has been withdrawn from engagement with the gear blank, and the tool saddle and the table are about to be moved in their reverse direction. The rocking movement of the shaft 443 is communicated to a lever 446 secured to the outer end of the rock shaft 443, and a link 447 that is pivoted at one end to the lever 446 is thereby moved to the right, as seen in Figs. 45 and 46, thus rocking a lever 448 and a rock shaft 449 to which the lever 448 is secured. The rocking movement of the rock shaft 449 is communicated to a lever 450 which is centrally pivoted on the rock shaft 449 and which may be pivoted at either of its ends to a tubular link 451 that extends across and beneath the table 3. The two points of attachment between the levers 450 and the link 451 are provided in order that the index-operating cam 390 may be moved in either of two directions, as desired, or as the nature of the work may require.

The end of the link 451 opposite to the lever 450 is pivotally attached to a lever 452 that is secured to a vertical rock shaft 453, to which is also rigidly attached a lever 454 of the form shown in Figs. 2, 49 and 50. The outer forked end of the lever 454 embraces a roller 455 that is secured by means of a pin 455ᵃ to a segmental member 456 which is slidably disposed in an arcuate groove 457 formed in the frame of the machine as indicated in Figs. 2, 49 and 50. The segmental member 456 is provided in its upper side with an inverted T-shaped slot 458 and the cam 390, best shown in Figs. 38 and 41, is adjustably secured to the segmental member 456 by means of a bolt 459 and a nut 460. The adjustment of the cam along the segmental member 456 permits the cam to be properly positioned so as to be in operative relation to the lever 387, whatever may be the arc through which the table swings in cutting gear teeth of different pitches on blanks of different diameters. It is to be noted that the only movement of the cam 390 is its short reciprocation with the segmental member 456, and that the indexing mechanism, including the lever 387 with which the cam coöperates, oscillates bodily with the table as each tooth is cut.

It will be evident that, when the cam disk 153 is rotated in a counter-clockwise direction, so as to bring the lug 442ᵃ into engagement with the lever 372, and while the table is at rest, the segmental member 456 will be moved downward in Fig. 49, thus carrying the cam 390 to the left, as shown in Fig. 41, whereby the members 388ᵃ and 395ᵃ are withdrawn from the slot in the locking disk in the manner described above through the levers 387 and 388. The table begins its return movement at about this time, and the bevel pinion 337 rolls over the gear ring 335, thus setting the indexing gearing in motion. When the cam disk 153 begins its rotation in a clockwise direction, the roller 389 rolls from the cam 390 and the lever 444 is left free to return to its original position and thereby return the cam 390 to its starting position. The return of the lever 444 is effected by the lug 442, which engages the roller 445, about the time when the cam disk 153 finishes its half revolution in a clockwise direction. This return movement of the lever 444 therefore takes place at about the time when the table begins its rotation for cutting the gear tooth. When the roller 389 is removed from the cam 390, as described above, the spring 396 draws the lever 388 toward the locking disks. Since the rotation of the table has caused partial rotation of the locking disks, the pin 395 travels in the periphery of its coöperating disk until the locking disk completes one revolution, when the pin 395 enters the slot in the locking disk and stops the indexing operation. The table continues its rotative movement to its starting position, the parts of the friction clutch slipping during such movement.

The table 3 may be pivotally supported upon the standards 1 in any usual and well known manner. As shown in Fig. 2, the standards 1 support a sleeve 461, within which a cylindrical bushing 462, exteriorly threaded at its upper and lower ends, is keyed against rotation and rigidly secured against lengthwise movement by means of nuts 463 and 464, which together clamp the upper and lower edges of the sleeve 461. The nut 463 is provided with teeth which are engaged by a small pinion 465 secured to a vertical pin 466 that has a squared lower end 467, by which it may be turned to keep the bushing 462 tightly seated in the sleeve 461. A washer 468 prevents the shaft 466 from vertical movement in its bearings. The bushing 462 has a tapered internal bore adapted to receive a hollow arbor 469, to which the table 3 is rigidly attached. It is evident that the vertical adjustment of the bushing 462 will take up any lost motion between its tapered bore and the tapered exterior of the arbor 469. The arbor 469 is prevented from vertical displacement within the bushing 462, by means of a circular plate 470 bolted to the lower end of the arbor 469 and provided with a central opening 472 at least as large as the bore in the arbor 469.

Secured to the sleeve 461 upon the standards 1, is a spider 480 that supports a circular track 481. Upon the track 481 rests a circular flange 482, which is secured beneath the table 3 and which supports its weight. An oil-pan 483 is disposed around the edge of the table 3 to receive chips and oil, or other lubricating fluid used during the cutting operation, which may be supplied to the cutting tool by means of an oil pump 484 which is shown in dotted lines in Fig. 1 and which may be driven from the auxiliary power shaft 100. This oil pan is secured to the ring 318 by means of brackets 484 shown at the left of Fig. 2.

In order to support the weight of the indexing mechanism, which, as stated above, is secured to the ring 318, it is desirable to provide a bracket secured to the ring 318 and moving with it. Such a support is shown in Fig. 4, consisting of a hollow cylindrical member 485 provided with a flange 486 and with bolts 487 for attaching the support to the ring 318. Slidably keyed within the cylindrical member 485 is a plunger 488, which is pressed downwardly by a compression spring 489 and which carries at its lower end a roller 490, resting upon a bracket shelf 491 that is formed in or secured to the frame 14. Suitable means may be provided for securing gear blanks to the table 3 and for maintaining them properly centered upon the table and rigidly secured against relative rotation thereon.

As shown in Fig. 4, the blank is maintained at an elevation above the table, sufficient to bring its median plane approximately opposite the horizontal diameter of the cutting tool, by means of spacing sleeves 479, surrounding the work holding spindle.

Figure 55:
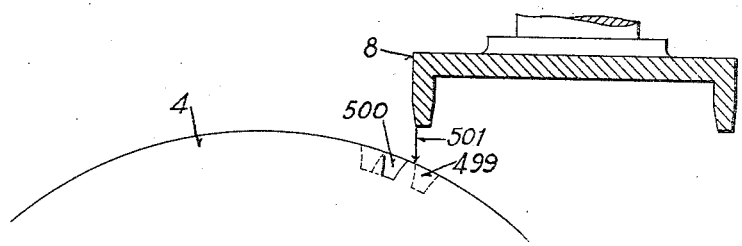
Figure 56:
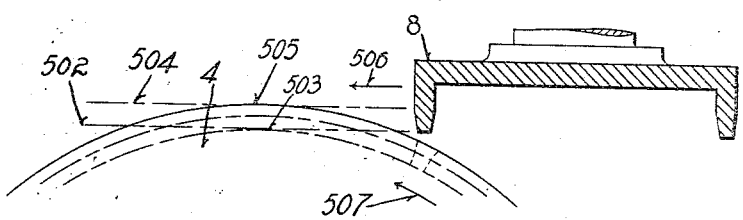
Figure 57:
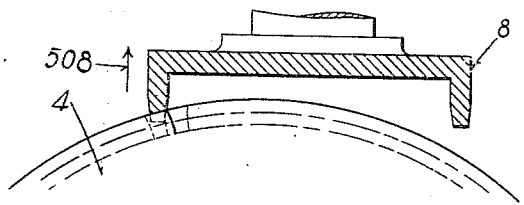
Figure 58:
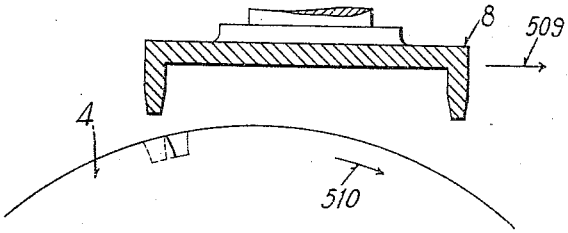
Figure 59:
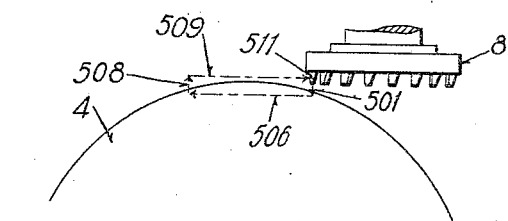

The mode of operation of my machine may best be described by reference to Figs. 55 to 59, inclusive, in which the sequence of movements imparted to the gear blank and to the cutting tool are diagrammatically shown. In Figs. 55 to 58, the cutting tool 8 is shown in diametral section and a segment of the gear blank 4 is shown in plan, while in Fig. 59, both the cutting tool and the segment of the gear blank are shown in plan. The cutting tool 8 is shown in Fig. 55 in its starting position, and the outline of the side of the tooth slot to be cut is shown in dotted lines at 499, the last preceding tooth slot being shown at 500. The tool and the blank being in the relative position shown, the cutting tool is caused to advance axially in the direction of the arrow 501 into position for engagement with the gear blank 4, the gear blank being at rest. This position is shown in Fig. 56 in which the cutting tool 8 may or may not be in contact with the periphery of the gear blank. In this position, the outer edges of the cutting tools are disposed in a line 502 parallel to the face of the cutting tool and tangent to the root circle of the gear blank 4 at the point 503. The inner edges of the cutting faces of the cutters are in a line 504 parallel to the line 502 and tangent to the periphery of the gear blank at 505.

The rotatory cutting tool 8 is then caused to move laterally in the direction of the arrow 506 and rotary movement is simultaneously imparted to the blank 4 in the direction of the arrow 507, whereby the blank and the cutting tool are brought into cutting engagement. During this mutual movement of the blank and the cutter, the cutting and forming of the tooth space takes place, and this cutting engagement continues until the cutting tool and the blank have moved to the position shown in Fig. 57. The mutual movement of the gear blank and the cutting tool then cease, and the cutting tool is withdrawn from the blank, in the direction of the arrow 508, to the position shown in Fig. 58 and it is then returned to its initial position, moving in the direction of the arrow 509, Fig. 58. During this return movement of the cutting tool, the gear blank is rotated in the direction of the arrow 510 over the same arc through which it was rotated during the cutting operation. This lateral rotation of the table effects the operation of the indexing mechanism by reason of the rolling engagement between the pinion 337 and the gear ring 335. Therefore, when the table reaches its starting position at the end of its return rotation, the blank is in position to have the next tooth cut in its face. The next cycle of operations is begun by advancing the cutting tool again in the direction of the arrow 501, Fig. 55, while the gear blank is at rest and after the horizontal movement of the cutting tool has ceased.

The movements described above may be summarized by reference to Fig. 59 in which the movements of the cutting tool are shown by means of a parallelogram of dotted arrows 501, 506, 508 and 509 which correspond to the similarly numbered arrows in Figs. 55 to 58. These arrows indicate the directions in which the point 511 of the cutting tool moves in describing a complete cycle of operations.

In operating the machine to carry out the movements just described, the gear blank is first positioned on the table by means of the spacing sleeves 479 and the jack screw support 5. The tool saddle 10 is then moved to a central position with respect to the gear blank by loosening the bolts 116ª and rotating the bracket 116 so as to disengage the gear wheels 117 and 118, and then applying a wrench to the square outer end 90ª of the shaft 90. The feed screw 46 is thereby rotated so as to move the tool saddle to nearly the desired position. If final adjustment along the feed screw 46 is later required, this may be accomplished by turning the hand wheel 225. The motor 22 is then started and the rail 11 is moved about its pivot 12 by manipulating the clutch handle 292 until the face of the cutting tool is nearly in engagement with the blank, when the shifting clutch is thrown out and the motor stopped. The tool saddle should then be moved a short distance to one side along the feed screw 46 and the cutting tool advanced by means of the hand wheel 236ª until the face of the cutting tool is tangent to the pitch circle of the gear blank, or to the base circle of the gear blank, according to the method of cutting which is selected. If the center of the face of the blank is not in exact alinement with the horizontal diameter of the cutting tool, this adjustment may be effected by turning the hand wheel 206. The proper change gears and index gears are next selected and put in place, in order that the rotation of the blank of the feed screw and of the indexing mechanism may be properly proportioned. The gear wheels 112, 113, 117 and 118, shown in Figs. 4, 6 and 20, are selected according to the size of the gear blank to be cut, while the gear wheels 369, 370, 376 and 377, shown in Fig. 39, are selected according to the number of teeth to be cut in the gear. The pin 395 is also positioned in the head 391 to suit the gear wheels just mentioned. Other speed adjustments may be effected by shifting the gear wheel 62 by means of the handle 68 so as to bring this gear wheel into engagement with any one of the series of gear wheels 55, 56, 57 and 58. The variable speed motor and the back gearing associated therewith make possible still further speed variations.

All of the change gearing having been properly put in place, the tool saddle 10 is advanced along the feed screw 56 by manipulating the hand wheel 225 until it is just in engagement with the periphery of the gear blank, and the collar 405 is then moved along the rod 403 at the back of the machine until it engages the dog 402 and is fastened in place by means of the set screw 407. The motor 22 is again started. By means of the hand-operated clutch shifting rod 416, the clutch 91 is then actuated, thus beginning the positive cutting stroke of the machine. When the cutting of the first tooth is just completed, the machine is stopped by means of the hand-operated rod 416, and the collar 405 is moved along the rod 403 into engagement with the dog 402, and is secured in place by means of the set screw 406. The cam 390 is moved along the curved sector 456 until it engages the roller 389 carried by the lever 387 and releases the indexing mechanism. After securing the cam 390 in its adjusted position by means of the nut 460 and the bolt 459, the automatically-operated clutch shifting lever 92 is operatively secured to the shifting rings 438 and 431 by means of the bolt 440, and by manually operating the clutch shifting rod 416 the clutch 91 is again actuated and the locking and timing mechanism simultaneously released. Thereafter, the sequence of operations which have already been described are automatically carried out until the cutting tool has made a cut for each tooth space of the gear wheel.

Throughout this series of operations, the tool spindle 9 is constantly rotated by power derived from the motor 22, through shaft 32, miters 35 and 37, vertical shaft 38, gear wheels 39 and 40, shaft 41, miters 42 and 43, shaft 44, miters 258 and 259, and the large herring-bone gear wheel 270.

At the beginning of each tooth-cutting operation, the cutting tool is advanced to engage the gear blank by power taken from the small motor 23 through pinion 98, gear wheel 99, shaft 100, pinion 124, clutch gear 125, friction clutch 126, shaft 127, clutch 133, miters 128 or 129 and 130, shaft 131, gear wheels 132 and 134, shaft 135, miters 136 and 137, tubular shaft 138, gear wheels 139 and 140, shaft 141, miters 142 and 143, shaft 45, worm gears 249 and 250, vertical shaft 251, miters 254 and 255, shaft 243, worm 242, worm ring 241 and threaded sleeve 239. At the conclusion of each cutting operation, the cutting tool is withdrawn from engagement with the gear blank by the train of gearing just described, acting in a reverse direction, such reversal being effected by the engagement of the dog 402 with the collar 404, whereby shaft 404, link 411, lever 413, link 415, and clutch-shifting lever 144 are moved to the right, as seen in Fig. 5 and to the left, as seen in Fig. 6. This movement of the lever 144 shifts the clutch 133 from miter 128 to miter 129, and simultaneously rocks the T-shaped lever 148, which releases the locking and timing mechanism 149 to 176, and permits the tool-withdrawing mechanism to operate during a half rotation of the cam disk 153.

The movement of the tool saddle 10, in its working or cutting stroke, is effected by power taken from the motor 22 through shaft 32, bevel pinion 36, bevel gear 47, vertical shaft 48, bevel pinion 49, bevel gear 50, shaft 51, gear wheels 52 and 53, shaft 54, change-speed gearing 55 to 77, shaft 72, miters 85 and 86, shaft 87, clutch 91, which at this time is in its operative position, gear wheels 88 and 89, shaft 90, bevel pinion 93, bevel gear 94, tubular shaft 95, miters 96 and 97, feed screw 46 and the saddle nut 207. In order to move the tool saddle in its return stroke, the feed screw is caused to rotate in the reverse direction by power taken from the small motor 23 through pinion 98, gear wheel 99, shaft 100, miters 101 and 102, inclined shaft 103, worm 104, worm wheel 105, shaft 106, clutch 108, gear wheels 107 and 109, screw shaft 110, gear wheels 112 and 113, shaft 114, gear wheels 117 and 118, shaft 119, gear wheels 120 and 121, and shaft 90. Before this train of gearing is actuated, clutch 91 is disconnected from the gear wheels 89 and the clutch 108 is connected to the gear wheel 107 by means of the shifting lever 91, under the influence of the cam groove 181 that is formed on the cam disk 153, lever 179ª, rocking shaft 179, lever 178 and link 177.

The oscillation of the blank-supporting table is effected by engagement between the segmental rack 19 and the reciprocating straight rack 20, the straight rack being moved to the left, Fig. 1, by power from the main motor 22 and to the right by power from the small motor 23. Power to effect the movement to the left, which moves the table 3 during the cutting operation is taken from the shaft 90, which is driven from the motor 22 by the train of gearing already described, through gear wheels 121 and 120, shaft 119, gear wheels 118 and 117, shaft 114, gear wheels 113 and 112, and screw shaft 110. The reverse rotation of the screw shaft 110 during the return stroke of the machine reciprocates the rack 20 to the right, Fig. 1. The train of gearing for effecting this reverse rotation of the screw shaft 110 from the small motor 23 has already been described.

The indexing operation, as indicated in connection with the description of the structural details of the index mechanism, is effected by the rolling of the pinion 337 on the gear ring 335 during the return rotation of the table 3, the index mechanism being released by the engagement between the cam 390 and the roller 389 on the lever 387.

When all of the tooth spaces have been cut by the machine, operating in the manner described above, machine is stopped, and the cutting tool 8 is replaced by another and similar cutting tool 8ª, the internal radius of which is equal to the external radius of the first cutting tool, these radii being measured from the axes of the respective cutting tools to the points where the finishing edges of the cutters intersect the pitch circle of the gear blank during the cutting operation. In order that the second cutting tool may enter the tooth spaces already cut by the first cutting tool, the tool saddle 10 is moved along the feed screw 46 a distance equal to one-half the pitch of the teeth being cut, this movement of the tool saddle being effected by turning the handle 225. The machine is again started, and continues its operation until the second cutting tool has operated upon each of the teeth of the gear wheel, and thus completing the gear. The use of two cutting tools is necessary in order that both the concave and convex edges of each of the gear teeth may describe arcs of circles having the same radius. The relative proportions of the two cutting tools are illustrated in Figs. 51 and 52, a similar pair of cutting tools of a modified form being shown in Figs. 53 and 54. The dotted lines on Figs. 51 and 52 intersect the points on the cutting edges of the cutting tools which intersect the pitch line of the gear being cut and it will be noted that the radii AB of the cutting tools 8 shown in Figs. 52 and 54, are equal to the radii CD of the cutting tools 8ª shown in Figs. 51 and 53.

The use of two cutters in the manner just described produces gears and pinions which are adapted to mesh with one another interchangeably. It is, however, possible to cut a given pair of meshing gears more economically by cutting one, preferably the one having the larger number of teeth, with a single cutter, and then cutting the other gear that is to mesh with the first gear with two cutters having unequal radii corresponding to the inner and outer radii of the cutter used in forming the first gear. Such a pair of gear wheels will mesh with each other, but not with other gears of the same pitch, which have not been cut in the same special manner. In practice, I prefer to make use of a third cutter in addition to the pair of cutters described, the third cutter being used to rough out the tooth spaces, while the cutter 8 is used to finish the concave sides of the teeth and the cutter 8ª to finish the convex sides of the teeth.

As has already been mentioned, my machine is adapted to cut gear teeth with reference either to the pitch circles or to the base circles of gear blanks. If the cutting is performed with reference to the pitch circles, cutting tools of the form shown in Figs. 51 and 52 should be used, but if the cutting is to be performed with reference to the base circles of the gears, cutters of the form shown in Figs. 53 and 54 should be used. In these cutters, only the points 8ᶜ and 8ᵈ perform the cutting operation, and the cutting tool must be advanced so that its face may be tangent with the base circle instead of the pitch circle of the gear blank. By the use of cutters such as those shown in Figs. 53 and 54, gears having the properties of perfect involute gears are produced, and if the base circle of the gear is coincident with its root circle, the gears produced are absolutely perfect involutes. If the base circle should not coincide with the pitch circle, it is necessary to cut the tooth spaces deeper in the centers than at the ends of the teeth in order to allow clearance for the teeth when they are meshed together. Except for this extra depth in the centers of the teeth, such gears are perfect involutes. Gears cut with reference to their pitch circles are perfect involutes at the middle points of the teeth, but vary slightly from true involute form at the ends of the teeth, the cross-sections of the teeth, in places perpendicular to their axes of rotation, being hyperbolic. This variation from the true involute form is exceedingly small, and is not sufficient to cause difficulty in the proper meshing of the gears, especially because the slight deviations from involute form on a pair of meshing gears neutralize each other and produce the effect of a pair of meshing gears of true involute form.

The structural details of my machine may be variously modified by persons skilled in the art to which my invention appertains without departing from the spirit and scope of my invention. It is therefore to be understood that my invention is not restricted to the precise embodiment herein disclosed, but that it comprehends all such structural modifications as fall within the scope of the appended claims.

I claim as my invention:

1. A gear-cutting machine comprising means for rotatively supporting a gear blank, a cutting tool adapted to move in a curved path, means for moving the said cutting tool into cutting engagement with the said blank, means for moving the said tool past the said blank in the direction of the latter's rotation during the cutting operation, and means for simultaneously rotating the said blank about its axis to maintain the same tooth space of the said blank in engagement with the said cutting tool during such lateral movement.

2. A gear-cutting machine comprising means for rotatively supporting a gear blank, a hollow milling tool, means for moving the said milling tool into cutting engagement with the said blank, means for moving the said tool past the said blank in the direction of the latter's rotation during the cutting operation, and means for simultaneously rotating the said blank about its axis to maintain the same tooth space of the said blank in engagement with the said cutting tool during such lateral movement.

3. In a gear-cutting machine, the combination of a vertical spindle adapted to rotatively support a gear blank, a horizontal spindle carrying a rotary cutting tool comprising a plurality of cutting blades adapted to rotate about an axis lying substantially in the median plane of the gear blank, means for advancing and withdrawing the said cutting tool with respect to the gear blank, means for reciprocating the said cutting tool bodily in a direction perpendicular to the axis of rotation of the cutter and the axis of the blank, and means for turning the gear blank on its axis at a speed proportional to the speed at which the cutting tool is reciprocated.

4. In a gear-cutting machine, means for rotatively supporting a gear blank upon a vertical axis, a horizontal spindle, means for rotating the said horizontal spindle and for reciprocating it in a horizontal direction both longitudinally and laterally, a rotary cutting tool mounted on the said horizontal spindle, and means for partially rotating the said blank-supporting means in timed relation to the lateral reciprocation of the said tool-carrying spindle, whereby the said cutting tool is brought into engagement with the gear blank and maintained in engagement therewith during the partial rotation of the gear blank and the lateral movement of the tool spindle in one direction.

5. A gear-cutting machine comprising a blank support, a cutting tool, a pivoted support for the said cutting tool, a curved track for supporting the other end of the said pivoted support, and means for varying the position of the end of the said support upon the said track.

6. A gear-cutting machine comprising a blank support, a cutting tool, a pivoted support for the said cutting tool, a curved track for supporting the other end of the said support, and means for varying the position of the end of the said support upon the said track, the said means comprising a rack secured to the said track, a pinion adapted to engage the said rack and secured to move with the said support, and means for rotating the said pinion.

7. A gear-cutting machine comprising a blank support, a cutting tool, a pivoted support for the said cutting tool, a curved track for supporting the other end of the said support, and means for varying the position of the end of the said support upon the said track, the said means comprising a segmental rack secured to the said track, a pinion engaging the said rack and secured to move with the said support, power-driven means for rotating the said pinion, and a clutch for controlling such rotation.

8. A gear-cutting machine comprising a blank support, a cutting tool, a pivoted support for the said cutting tool, a curved track for supporting the other end of the said support, and means for varying the position of the end of the said support upon the said track, the said means comprising a segmental rack secured to the said track, a pinion engaging the said rack and secured to move with the said support, a power-driven means for rotating the said pinion, a clutch for controlling such rotation, and means for disconnecting the said power-driven means from the said pinion.

9. A gear-cutting machine comprising a blank-supporting table, a cutting tool, a pivoted support for the said cutting tool, a curved track for supporting the other end of the said support, and means for varying the position of the end of the said support upon the said track, the said means comprising a segmental rack secured to the said track, a pinion engaging the said rack and secured to move with the said support, a vertical shaft carrying the said pinion, a power-driven horizontal shaft extending longitudinally along the said support, means for connecting the said horizontal shaft to the said vertical shaft to drive the latter shaft, the said connecting means including a reversing clutch, and means for manually disconnecting the said horizontal shaft from the said vertical shaft.

10. A gear-cutting machine comprising a blank support, a tool-carrying spindle associated therewith, a longitudinally reciprocable bearing for the said spindle provided with external screw threads, an internally-threaded gear ring engaging the said screw threads, and a manually-operable worm cooperating with the said gear ring for effecting longitudinal adjustment of the said spindle.

11. A gear-cutting machine comprising a blank support, a tool-carrying spindle associated therewith, a longitudinally reciprocable bearing for the said spindle, manually operable means for effecting longitudinal adjustment of the said bearing and the said spindle, an annular member surrounding the said bearing and provided with external screw threads, and power-driven means engaging the said screw threads for automatically reciprocating the said bearing and the said spindle longtiudinally.

12. A gear-cutting machine comprising a blank support, a tool-carrying spindle associated therewith, a longitudinally reciprocable bearing for the said spindle, manually-operable means for effecting longitudinal adjustment of the said bearing and the said spindle, the said manually-operable means including an annular member surrounding a portion of the said bearing and provided with external screw threads, an internally threaded gear ring engaging the said screw threads, and a power-driven pinion exteriorly engaging the said gear ring for automatically reciprocating the said bearing and the said spindle longitudinally.

13. A gear-cutting machine comprising a rotary tool-carrying spindle, means for reciprocating the said spindle longitudinally with respect to its axis, and means for rotating the said spindle continuously during such reciprocation, the said rotating means comprising a shaft disposed parallel to the axis of the said spindle and adapted to reciprocate therewith, gearing for causing the said spindle to be driven by the said shaft and including a driving gear slidably keyed to the said shaft and means for permitting the said driving gear to adjust itself to the movement of the said spindle.

14. A gear-cutting machine comprising a rotary tool-carrying spindle, means for reciprocating the said spindle longitudinally with respect to its axis, and means for rotating the said spindle continuously during such reciprocation, the said rotating means comprising a gear wheel secured to the said spindle, a pinion meshing with the said gear wheel, a shaft carrying the said pinion and disposed parallel to the axis of the said spindle, and a relatively stationary gear for rotating the said shaft and slidably keyed thereto.

15. A gear-cutting machine comprising a rotary tool-carrying spindle, means for reciprocating the said spindle longitudinally with respect to its axis, and means for rotating the said spindle continuously during such reciprocation, the said rotating means comprising a gear wheel secured to the said spindle, a pinion meshing with the said gear wheel, a shaft carrying the said pinion and disposed parallel to the axis of the said spindle, and a relatively stationary driving gear slidably keyed to the said shaft, whereby the said shaft reciprocates in unison with the said spindle and slides with respect to the said driving gear during such reciprocation.

16. A gear-cutting machine comprising a rotary tool-carrying spindle, means for reciprocating the said spindle longitudinally with respect to its axis, and means for rotating the said spindle continuously during such reciprocation, the said rotating means comprising a gear wheel secured to the said spindle, a pinion meshing with the said gear wheel, a shaft carrying the said pinion and disposed parallel to the axis of the said spindle, a driving gear slidably keyed to the said shaft, means for preventing bodily movement of the said driving gear, and means for rotating the said driving gear.

17. A gear-cutting machine comprising a cutting tool, clutch-controlled means for bodily moving the said cutting tool at predetermined intervals in predetermined directions and for predetermined periods, and means for controlling the time of such movements comprising a cam disk provided with a groove having a concentric portion, a portion nearer the axis of the said disk than the said concentric portion, and a portion farther from the axis of the said disk than the said concentric portion, and a clutch-actuating lever provided with a roller adapted to occupy the said cam groove.

18. A gear-cutting machine comprising a cutting tool, clutch-controlled means for bodily moving the said cutting tool at predetermined intervals in predetermined directions and for predetermined periods, and means for controlling the time of such movements comprising a rotatable disk provided with a cam groove having a concentric central portion, one end portion nearer the axis of the said disk than the said concentric portion and the other end portion farther from the said axis than the said concentric portion and a clutch-actuating lever provided with a roller adapted to occupy the said cam groove.

19. A gear-cutting machine comprising a blank support, a cutting tool associated therewith, clutch-controlled means for moving the said cutting tool at predetermined intervals, in predetermined directions and for predetermined periods, means for imparting an indexing movement to the said blank support, and means for controlling the time of such movements of the said blank support and the said tool, the said timing means comprising a clutch-controlling lever, an index-controlling lever and a rotatable disk provided with a cam portion adapted to coöperate with the said clutch-controlling lever and with lugs adapted to operate the said index-controlling lever.

20. A gear-cutting machine comprising a blank support, a cutting tool associated therewith, means for successively imparting to the said cutting tool a bodily movement toward the work, a cutting movement, a withdrawing movement and a return movement, and timing mechanism for effecting the said successive movements at predetermined intervals, the said timing mechanism comprising a source of auxiliary power, a shaft driven thereby, means for rotating the said shaft intermittently in alternately opposite directions and gearing for advancing and withdrawing the said cutting tool by means of the said alternate rotations of the said shaft.

21. A gear-cutting machine comprising a blank support, a cutting tool associated therewith, means for successively imparting to the said cutting tool a bodily movement toward the work, a cutting movement, a withdrawing movement and a return movement, and timing mechanism for effecting the said successive movements at predetermined intervals, the said timing mechanism comprising a source of auxiliary power, a shaft driven thereby, means for rotating the said shaft intermittently in alternately opposite directions, gearing for advancing and withdrawing the said cutting tool by means of the said alternate rotations of the said shaft, clutches for controlling the working and return movements of the said cutting tool, a disk provided with a cam portion for controlling the said clutches and reduction gearing for oscillating the said disk by means of the said intermittently rotating shaft.

22. A gear-cutting machine comprising a cutting tool, clutch-controlled means for bodily moving the said cutting tool at predetermined intervals, in predetermined directions and for predetermined periods, and means for controlling the time of such movements comprising a clutch-controlling cam disk, a driving shaft adapted to be rotated intermittently in alternately opposite directions, and reduction gearing for oscillating the said disk at reduced speed by means of the said shaft.

23. A gear-cutting machine comprising a cutting tool, clutch-controlled means for bodily moving the said cutting tool at predetermined intervals, in predetermined directions and for predetermined periods, and means for controlling the time of such movements comprising a clutch-controlling cam disk, an intermittently rotated shaft for oscillating the said disk, and means for locking the said disk when it has completed a half revolution in either direction.

24. A gear-cutting machine comprising a cutting tool, clutch-controlled means for bodily moving the said cutting tool at predetermined intervals, in predetermined directions and for predetermined periods, and means for controlling the time of such movements comprising a clutch-controlling cam disk, an intermittently rotated shaft for oscillating the said disk, means for locking the said disk when it has completed a half revolution in either direction, and means for releasing the said locking means at predetermined intervals.

25. A gear-cutting machine comprising a cutting tool, clutch-controlled means for bodily moving the said cutting tool at predetermined intervals in predetermined directions and for predetermined periods, and means for controlling the time of such movements comprising a clutch-controlling cam disk, an intermittently rotated shaft for oscillating the said disk, and means for locking the said disk when it has completed a half revolution in either direction, the said locking means comprising a locking disk secured to the said cam disk, a second locking disk adjacent to the said first named locking disk and adapted to rotate in unison with the said intermittently rotated shaft but at different speed, each of the said locking disks being provided with a transverse groove that are adapted to combine, at proper intervals, to form a single continuous groove, and spring-pressed latches diametrically disposed with respect to the said locking disks and adapted to enter the said combined groove.

26. A gear-cutting machine comprising a blank-supporting table, a cutting tool associated therewith, means for imparting to the said cutting tool a cutting movement and a return movement, and means for initiating and stopping the said movements at predetermined intervals comprising a set of reversing clutches, an auxiliary source of power, a friction clutch, a shaft driven from the said auxiliary source of power through the said friction clutch, a reversing clutch associated with the said shaft, means operated by the said table-oscillating means for shifting the said reversing clutch, means controlled by the said reversing clutch and operated by the said auxiliary source of power for actuating the first-named set of reversing clutches, means for locking the said clutch-actuating means successively in positions in which the said cutting tool is moved in its cutting and reverse movements, and means, operable by the said clutch-shifting means, for releasing the said locking means.

27. A gear-cutting machine comprising tooth-cutting mechanism and indexing mechanism, means for operating the said indexing mechanism, the said operating means including a friction clutch, and means for locking the said indexing mechanism and permitting its operation only at predetermined intervals.

In testimony whereof, I have hereunto subscribed my name this 8th day of February, 1915.

HARRY A. S. HOWARTH.

Witnesses:
WESLEY G. CARR,
B. B. HINES.